(12) United States Patent
Anders et al.

(10) Patent No.: US 7,092,494 B1
(45) Date of Patent: Aug. 15, 2006

(54) TELEPHONE SYSTEM

(75) Inventors: Joseph C. Anders, Mobile, AL (US);
Kenneth Salter, Mobile, AL (US);
Seacol Chin, Mobile, AL (US); Mark
Jones, Mobile, AL (US)

(73) Assignee: Global Tel★Link Corporation,
Mobile, AL (US)

( * ) Notice: Subject to any disclaimer, the term of this
patent is extended or adjusted under 35
U.S.C. 154(b) by 0 days.

(21) Appl. No.: 09/516,381

(22) Filed: Feb. 29, 2000

Related U.S. Application Data

(63) Continuation-in-part of application No. 08/587,084, filed on Jan. 16, 1996, now Pat. No. 6,052,454.

(60) Provisional application No. 60/163,057, filed on Nov. 2, 1999.

(51) Int. Cl.
*H04M 1/64* (2006.01)

(52) U.S. Cl. .................. 379/68; 379/88.22; 379/93.03

(58) Field of Classification Search ........... 379/373.04, 379/374.02, 375.01, 142.01
See application file for complete search history.

(56) References Cited

U.S. PATENT DOCUMENTS

| | | |
|---|---|---|
| 4,027,109 A | 5/1977 | Smith et al. |
| 4,054,756 A | 10/1977 | Comella et al. |
| 4,371,752 A | 2/1983 | Matthews et al. |
| 4,477,698 A | 10/1984 | Szlam et al. |
| 4,540,855 A | 9/1985 | Szlam et al. |
| 4,626,630 A | 12/1986 | Waldman |
| 4,644,109 A | 2/1987 | Takeda et al. |
| 4,696,028 A | 9/1987 | Morganstein et al. |
| 4,698,840 A | 10/1987 | Dively et al. |
| 4,712,230 A | 12/1987 | Rice et al. |
| 4,723,273 A | 2/1988 | Diesel et al. |

(Continued)

*Primary Examiner*—Fan Tsang
*Assistant Examiner*—Olisa Anwah
(74) *Attorney, Agent, or Firm*—Dority & Manning, P.A.

(57) ABSTRACT

A telephone operating system is described. The invention is a telephone system have unique monitoring methods and equipment to allow the user to following conversations and retrieve portions of the conversation and to take certain actions in connection with conversations.

There may be two groups of users within the system, the first being the maker and recipient of the call and the other being a person or device monitoring the call. The system provides a telephone monitoring device for reading a biological marker for an individual and associating the marker with a pin number and associating the pin number with other call information to be stored with data on the call along with an interface means for storing information on a call from a group of information comprised of the locations from and to which the call is made, the PIN number and name or the maker, time when made and when finished, data of the call, telephone numbers and the like. The system may convert the telephone call to digital format for storage and to maintain a database of data, voices or sounds in a digital format, particularly secondary ring signals, and to compare the digital database of voices or sounds or data (particularly phone numbers, names, addresses and area codes) based on user controlled degrees of similarity and to take different actions from a group of actions including monitoring, marking, terminating or playing a recording before, after or in conjunction with the ongoing call. The invention to feed the data to the comparing mechanism at an accelerated rate, typically 4 to 5 times the speed of the original call, with or without filters for which isolate voice ranges or data ranges, with or without pitch attenuation to keep the voice at an apparently normal pitch.

24 Claims, 15 Drawing Sheets

U.S. PATENT DOCUMENTS

| | | |
|---|---|---|
| 4,727,577 A | 2/1988 | Frey et al. |
| 4,908,852 A | 3/1990 | Hird et al. |
| 4,920,558 A | 4/1990 | Hird et al. |
| 4,920,562 A | 4/1990 | Hird et al. |
| 4,933,966 A | 6/1990 | Hird et al. |
| 4,935,956 A | 6/1990 | Hellwarth et al. |
| 5,093,858 A | 3/1992 | Hird et al. |
| 5,109,408 A | 4/1992 | Greenspan et al. |
| 5,319,702 A | 6/1994 | Kitchin et al. |
| 5,355,403 A | 10/1994 | Richardson, Jr. et al. |
| 5,481,594 A * | 1/1996 | Shen et al. ............... 379/88.19 |
| 5,524,142 A | 6/1996 | Lewis et al. |
| 5,533,103 A | 7/1996 | Peavey et al. |
| 5,535,261 A | 7/1996 | Brown et al. |
| 5,539,812 A | 7/1996 | Kitchin et al. |
| 5,590,171 A * | 12/1996 | Howe et al. .................. 379/33 |
| 5,596,632 A | 1/1997 | Curtis et al. |
| 5,655,013 A | 8/1997 | Gainsboro |
| 5,745,558 A | 4/1998 | Richardson, Jr. et al. |
| 5,751,791 A | 5/1998 | Chen et al. |
| 5,796,811 A | 8/1998 | McFarlen |
| 5,812,650 A | 9/1998 | Gammino |
| 6,047,053 A * | 4/2000 | Miner et al. ........... 379/201.01 |
| 6,052,454 A * | 4/2000 | Kek et al. .................... 379/188 |

* cited by examiner

TELEPHONE SYSTEM

PRIORITY

This patent is a continuation in part of Ser. No. 08/587,084 filed Jan. 16, 1996, now U.S. Pat. No. 6,052,454 issued Apr. 18, 2000. This patent provisional patent 60/163,057 filed Nov. 2, 1999.

BACKGROUND OF INVENTION

1. Field of the Invention

The technology relates to telephone monitoring, comparing and recording devices.

2. Prior Art

Recording of telephone calls dates back to the 1920 (an example from Hellwarth (U.S. Pat. No. 4,935,956) is the Rice patent, U.S. Pat. No. 4,712,230) and digital recording dates U.S. Pat. No. 4,054,756 in 1976.

HELLWARTH: (FILED Apr. 20, 1989) The '956 patent discloses an electronic computer system for control of a telephone instrument. Phones of the present assignee with on-site cpu's were in circulation well before such filing date of the '956 patent. In fact, Dively, U.S. Pat. No. 4,698,840, cited in the Hellwarth '956 patent, and filed in 1985, shows a telephone with a CPU.

U.S. Pat. No. 5,535,261 to BROWN (FILED Aug. 20, 1993) is a phone patent directed towards selectively blocking or recording calls in response to some parameter. There are "parameters" marking calls where the parameter is a specific number, a triggering event, or a call feature or a type of call (such as a call to a specific number). Most of these events are at least generally present in the prior art as shown below. For example a message in response to a third line on a party call (U.S. Pat. No. 4,477,698) would be similar "three way calling". Termination or blocking of calls at this stage is covered in prior art, but not cited in the Brown application. Hird I–IV, discussed below (1990 issue dates), shows methods of reacting to call specific 'parameters'. The calls are continuously monitored for the parameter in question, calls may be blocked or recorded selectively and messages may be played back. All of these features are also shown below in the prior art.

GATEWAY II-McFarlen (filed Mar. 11, 1996) U.S. Pat. No. 5,796,811 discloses a method for determining three way call events.

The Hird U.S. Pat. Nos. 4,908,852; 4,920,558; 4,920,562; 4,933,966; 5,093,858 cover operator free call placement. All of the claims involve an 'electronic operator' where the phone has stored messages for collecting information from the call maker and call recipient. Billing information is also retrieved. Storage of call data information (mainly for billing) and automatic termination is discussed. Speech files are digitized and stored for purposes of playback within the phone. The main concept follows the prior art where the operator's various tasks are replaced by the cpu and automated responses along with a time keeping function for billing.

There have been 'electronic operators' within phones sold since 1989. These phones were purchased from inventories of such phones, although there were various upgrades to the systems as software design and hardware capabilities were refined. Some of this technology was felt to be present and in wide-spread use before 1989. A discussion of the pre-Hellwarth prior art (from Hellwarth) will shed some additional light.

U.S. Pat. No. 4,027,109 discusses call forwarding. Manipulation (termination) of some call features is discussed. U.S. Pat. No. 4,054,756 is a billing acknowledgment system for phones accomplishing the tasks claimed in Hellwarth and Hird to some extent. Another similar patent in scope is Frey, U.S. Pat. No. 4,727,577.

U.S. Pat. No. 4,371,752 covers storage of telephone data (more in the form of a high tech answering machine). Forwarding of the calls is covered. Storage and retrieval of call specific data is also covered. U.S. Pat. No. 4,477,698 appears to be an early patent for establishing a line signal of a desired type (a telephone pick-up) and providing information primarily for controlling party lines.

U.S. Pat. No. 4,540,855 is another signal detection patent.

Rice, U.S. Pat. No. 4,712,230 is a system for storing and monitoring telephone call discrete information. "Status" data is transmitted to a CPU. Diesel, U.S. Pat. No. 4,723,273 is a forwarding patent which allows data from the call to determine if it should be forwarded.

GENERAL DISCUSSION OF THE INVENTION

The invention is a telephone system having unique monitoring methods and equipment to allow the user to following conversations and retrieve portions of the conversation and to take certain actions in connection with conversations. The system has 2 parts. The first part is a novel grouping of elements for greater efficiency, lower costs and convenience. The second part is a method of manipulating telephone data and interacting with the novel grouping.

There may be two groups of users within the system, the first being the maker and recipient of the call and the other being a person or device monitoring the call. PIN markers are also disclosed.

Several main components are required to form the telephone apparatus about to be described. Of course, one component is the above-discussed phone system installed at a facility to provide access control for the telephones located there. The phone system of the facility operates in conjunction with a central office which is remote from the facility, perhaps even hundreds or thousands of miles away. The central office handles many such facility phone systems. Another of the main components is a computer workstation located at the facility. This is a PC-based apparatus with a variety of tasks, primarily in the nature of an interface. A recording system is another of the main components. It is also located at the facility. Finally, a file server with mass storage is also located at the facility to complete the telephone apparatus.

As can be ascertained from the above, the facility accommodates the workstation, phone system, recording system and the file server with mass storage. These are all networked together. The workstation is utilized as an interface to the telephone system to enter data for controlling access by the telephone, and individual users thereof, to the PSTN. The workstation is also an interface to the recording system in order to control which phone conversations are recorded. In addition, the workstation is utilized to retrieve data from the file server and its mass storage.

The remotely-located central office provides a variety of services for the facility. The facility phone system and the central office are in communication through the PSTN by modem or through a direct wire. In either case, a connection between the central office and the facility phone system can be made as and when the need arises. Such need arises in the following ways.

When access from a phone to the PSTN is sought by a caller, whether or not the call will be connected is a decision made by the central office. More specifically, when an inmate (in the prison example being used) wishes to make a telephone call, he will pick up a telephone and enter the multi-digit personal identification number (PIN number) which was assigned to him. At that point, the facility phone system will call the central office to communicate this information. The central office will perform a two-part validation check. The first part determines, based on phone-related data and PIN number-related data that it has previously received from the workstation via the facility phone system, whether based on the phone-related data the particular phone being used is within its activated time period, and whether based on the PIN number-related data the inmate qualifies for the requested call. In particular, such PIN number-related data reveals (1) whether the owner of the PIN number is permitted to use the phone now and (2) does the owner of the PIN number have the privilege of accessing the destination number. If so, then the call has passed one part of the validation check. The second part of the validation check determines whether the destination number is a billable number. This is important because the call must be paid for. The inmate typically does not pay for the call (although a pre-payment arrangement is available). The call normally must be made on a collect call basis. However, this creates the possibility of fraud if, for example, the destination number belongs to a pay phone. Thus, at this point the central office dials a service provider (such as SNET, TNS) that maintains a data base which can be used to ascertain whether the destination number is billable. If so, then both parts of the validation check have been satisfied, and the call is connected. In addition to performing validation checks, the central office also performs maintenance, billing, housekeeping and various other functions which are not directly pertinent to a description of the invention.

Just before the call is connected following the successful completion of a validation check, the recording system determines whether this call should be recorded. Recording control data is provided to the recording system from the file server, where it was previously stored by the workstation, and this data is compared with the call-related data (e.g. the origination number, PIN number, destination number). If the conditions set by the recording control data are met, then the conversation is recorded. When the call is ended, the recorded conversation data is transferred, or migrated, to the file server. The conversation data is stored together with the call-related data and other data useful to facilitate locating and retrieving a particular conversation. When the need for retrieving a particular conversation arises, certain search parameters are manually entered into the workstation which then communicates with the file server to identify and locate the conversation in storage. The specified conversation is then retrieved and made available on the workstation for display and/or audio playback.

It is an object of the invention to provide a telephone monitoring device for reading a biological marker for an individual and associating the marker with a pin number and associating the pin number with other call information to be stored with data on the call.

It is an additional object of the invention to provide a phone system with an interface means for storing information on a call from a group of information comprised of the locations from and to which the call is made, the PIN number and name or the maker, time when made and when finished, data of the call, telephone numbers and the like.

It is an additional object of the invention to convert the telephone call to digital format for storage and to maintain a database of data, voices or sounds in a digital format, particularly secondary ring signals, and to compare the digital database of voices or sounds or data (particularly phone numbers, names, addresses and area codes) based on user controlled degrees of similarity and to take different actions from a group of actions including monitoring, marking, terminating or playing a recording before, after or in conjunction with the ongoing call.

It is a further object of the invention to feed the data to the comparing mechanism at an accelerated rate, typically 4 to 5 times the speed of the original call, with or without filters for which isolate voice ranges or data ranges, with or without pitch attenuation to keep the voice at an apparently normal pitch.

It is a further object of the invention to encode the information in a format providing that any alteration of the data will result in a mark showing the data has been altered.

It is a further object to allow for data to be selected, stored or played back to be altered at a graphical user interface, such as a keyboard type entry.

Another object of the invention is to facilitate the use of a phone system located at a facility to record phone conversations originating from any of its telephones.

Another object of the invention is to facilitate the selected retrieval of phone conversations recorded by the phone system.

A further object of the invention is to control access by individual telephone users to the PSTN.

Yet another object of the invention is to control the recording of phone conversations based on the identity of individual telephone users.

Still another object of the present invention is to determine the destination number accurately and store it for later use.

These and other objects of the invention are attained in accordance with one aspect of the invention which is directed to a telephone system for communicating telephones located at a facility with a public switched telephone network (PSTN). A switching means connects the telephones with the PSTN. Access control data is provided which includes phone-related data and PIN number-related data. Control means actuates the switching means in accordance with the access control data.

Another aspect of the invention is directed to a telephone apparatus for communicating telephones located at a facility with the PSTN. A phone system is located at the facility, including switching means for connecting the telephones with the PSTN. Access control data is provided which includes phone-related data and PIN number-related data. Control means actuates the switching means in accordance with the access control data. A computerized central office is located remotely from the facility. A computer workstation is located at the facility along with a computer file server, a computerized recording system and means for communicating the central office, workstation, file server and recording system.

Yet another aspect of the invention is directed to a telephone apparatus for controlling access by telephones located at a facility to the PSTN and recording selected phone conversations. Means is provided for storing access control data and recording control data. Call-related data particular to an attempted call being made from one of the telephones is provided. A phone system is located at the facility, including access control means for providing selected access from the one telephone to the PSTN by connecting the attempted call based on a comparison of the access control data with the call-related data. Recording means is coupled to the phone system for recording conversation data generated when an attempted call has been connected to the PSTN. Recording control means selects which connected calls are to be recorded based on a comparison of the call-related data with the recording control data. Storage means stores the conversation data of connected calls selected to be recorded.

These and other objects and advantages of the invention will become better understood hereinafter from a consideration of the specification with reference to the accompanying drawings forming part thereof, and in which like numerals correspond to parts throughout the several views of the invention.

BRIEF DESCRIPTION OF DRAWINGS

For a further understanding of the nature and objects of the present invention, reference should be made to the following detailed description taken in conjunction with the accompanying drawings in which like parts are given like reference numerals and wherein.

DETAILED DESCRIPTION OF THE PREFERRED EXEMPLARY EMBODIMENTS

Figure 1A:
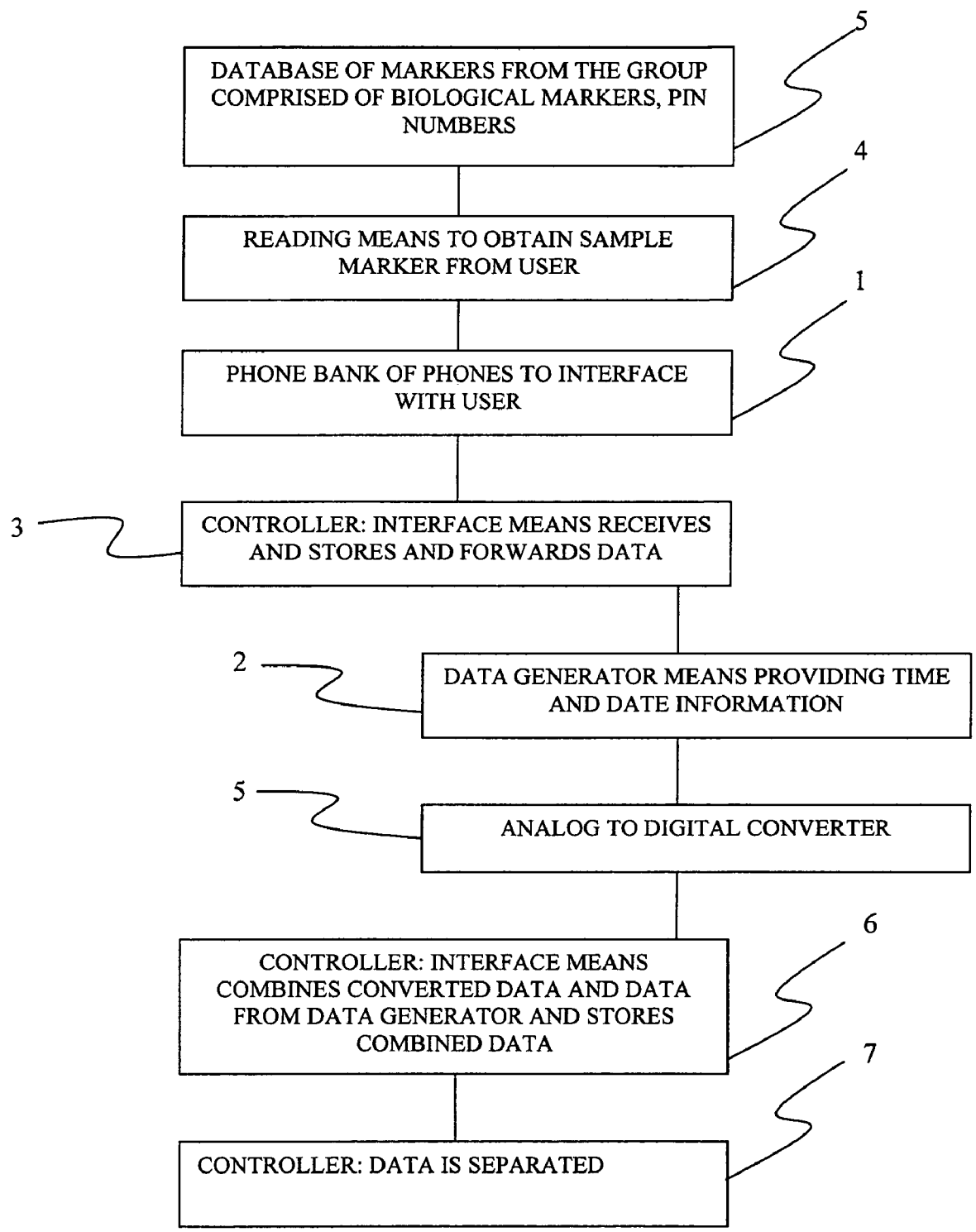
FIGS. 1a–1b is a flow chart showing the devices as they communicate.
Figure 8:
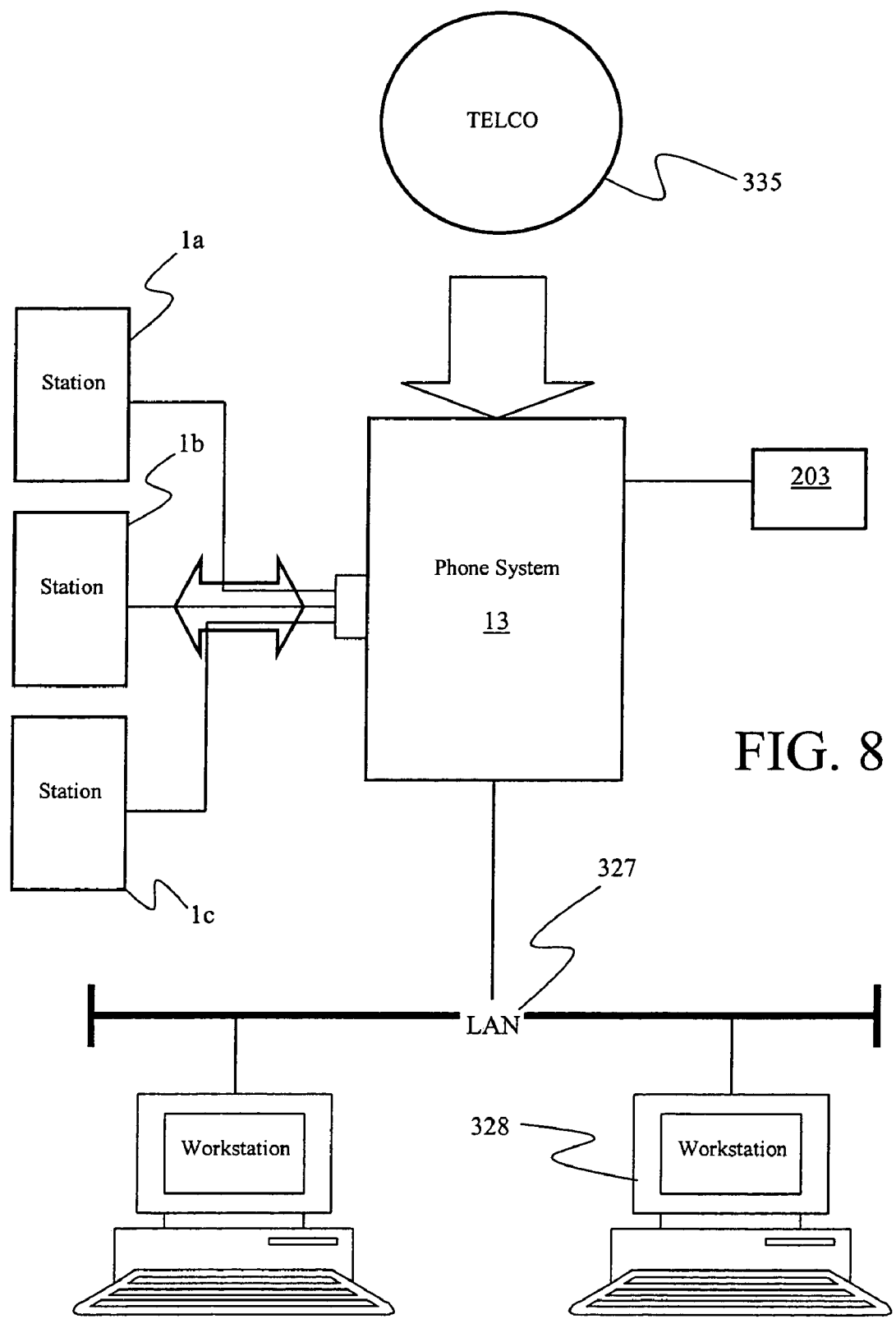
FIG. 8 is an alternate schematic block diagram of that shown in FIG. 7.
Figure 9:
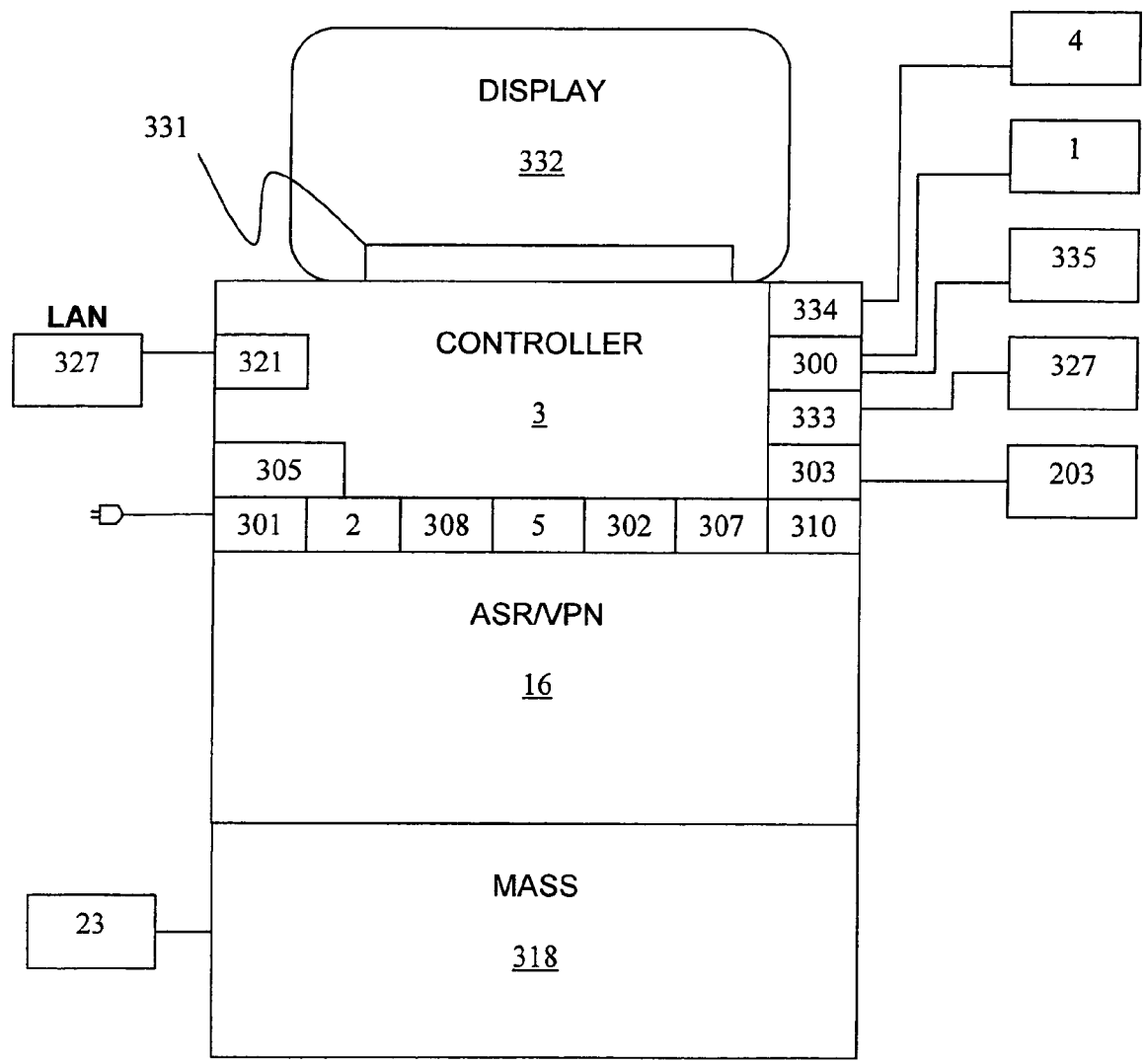
FIG. 9 is a detailed schematic block diagram of that shown in FIG. 8.
Figure 10:
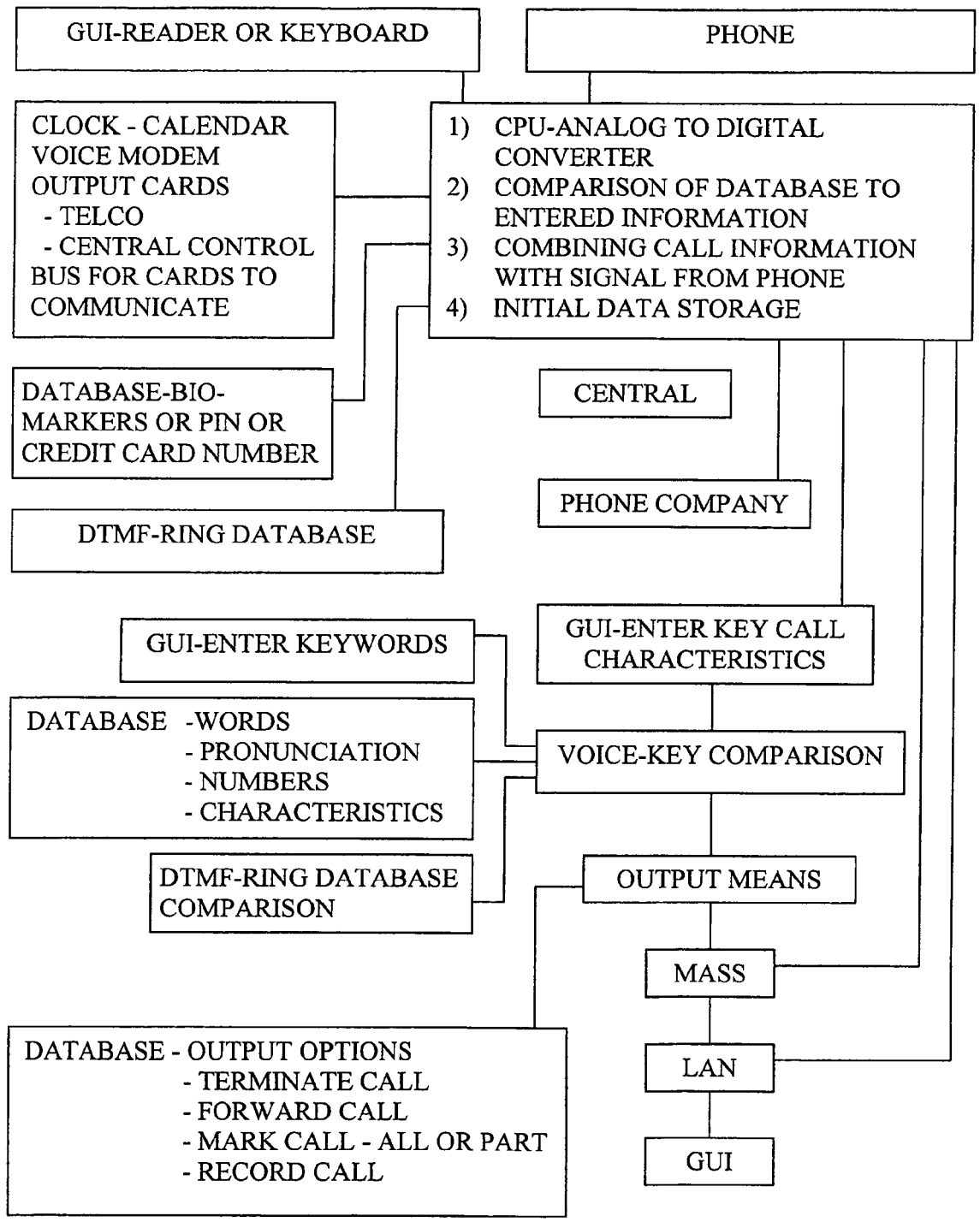
FIG. 10 is an alternate schematic block diagram of a phone system arranged in accordance with the invention.

An electronic computing system is described having parts which interact as shown in a block diagram format in FIGS. 1a–1b for use in the monitoring of telephone communications over which users can communicate by means of spoken or GUI commands through a phone bank 1, which may be one or a series of other phones 1a, 1b, etc. as shown in FIGS. 8 and 9 which show the specific elements and which are described in more detail below.

The telephones of the telephone bank 1 are prior art devices for converting voice signals to electromagnetic signals having wave characteristics. These provide analog voice and DSTM tone data. The phones and imaging equipment 4 may also send digital data. A phone interface controller 3 is disclosed which stores the data from the telephone. This controller 3 is a cpu having a hard drive and software for accomplishing this purpose. A more detailed discussion of the structure of these units follows.

The data from the phone 1 is then associated by way of a data generator 2 with call preselected data from a group of data comprising start time, finish time, location numbers, pin numbers, name of user, phone number called, location of origin, or other call variables. A data generator 2, such as a clock 2, may be used in conjunction with the phone 1 or controller 3 to provide the preselected data. In the preferred embodiment, the data generator 2 is within the CPU.

An analog to digital converter 5 is present for converting the electromagnetic signals to a digital format as a digital data pack containing the digital call and the call preselected data in the form of collections of datum within a data storage unit 6 or means for storing the digital data pack. This storage unit 6 is a hard drive operating with software within the central processing unit 3. A copy of this data in its original analog format may be allowed to go to the telephone company directly or through the controller when the call is completed as described in more detail with reference to FIGS. 8 and 9.

The data may be separated so that originating digital data, ring and voice data may be analyzed separately by a data separator means. The numeric data; phone numbers, PIN numbers and other data generated initially in a digital format; may also maintained separately from the beginning but is cross referenced with the voice data of the call by the controller combining means 6. The separator means is also driven by software separating out the desired portions of the call for the purposes described in more detail below.

In the preferred embodiment there are two separate comparing means, the ASR/VPN or voice comparing means 16 and the DTMF comparing means 8 which are provided for analyzing the voice and numeric data and the ring type DTMF data respectively.

Figure 1B:
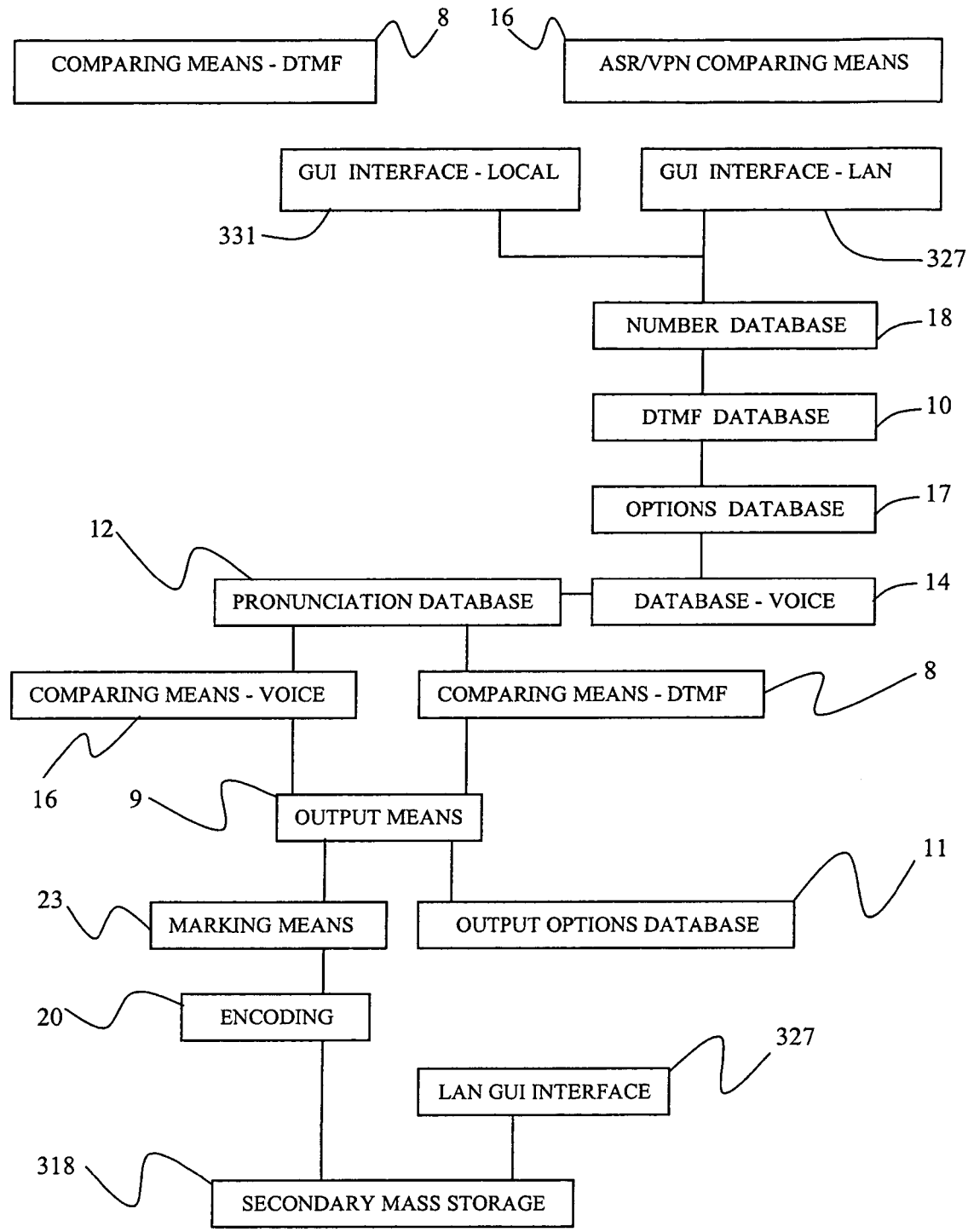

As shown in FIG. 1b a DTMF comparing means 8 takes the call data stored in the controller 3 and compares the data to a ring tone DTMF data base 10 containing pre-selected ring digital data corresponding to signals in a desired range of timing and frequency from the group of ring types comprising primary rings, secondary rings, dial tones, or other numbers or data comparison units. How these are identified and what option is taken is handled through a GUI interface, which may be from a central office 203, a local keyboard 331 or a computer on a Local Area Network 327.

A grouping function is provided by a separating means 7 within the controller 3 for grouping datum into datum groups (DG) comparable to the ring digital data in the DTMF database 10.

The DTMF comparing means 8 compares the datum groups to the ring digital data (RDD) from the call data from the interface means 6 in the call database. Comparing means 8 may also do a comparison against a number database 18 where digital data corresponding to tones for numbers are compared to digitally converted analog tones within the call data to determine if specific numbers are present.

In order to accelerate the comparisons discussed herein an accelerator means (not shown) may provided to feed the data to the comparing mechanism at an accelerated rate, typically 4 to 5 times the speed of the original call, with or without filters which isolate voice ranges or data ranges, with pitch attenuation to keep the voice at an apparently normal pitch.

Alternatively the device may accelerate the data in the ring database 10 or word data base 14 or number database 18, discussed below, to obtain adequate comparisons, with or without pitch attenuation. Acceleration of call data is desirable in order to allow near have real-time analysis of the call.

A GUI interface as discussed above is utilized in order to generate data from which the comparisons are made.

The comparing means for voice 16 and DTMF signals 8 utilize a comparison method which includes determining on the basis of a pre-selected percentage of certainty based on the amount of comparable datum based on timing and frequency between the RDD and the DG as an identified group.

The device may also include an options data base 11, also entered by GUI, containing a pre-selected group of options for a particular ring type from the group of options comprising terminating the call, marking the call with a marking means for associating a marker identifying the ring type with an identified group, playing a recorded message in conjunction with the call, forwarding the call, monitoring the call, storing the call in a data base with the marker, or related actions in communications with an output means 9 for effectuating the response from the group of options outlined in this paragraph.

A voice comparing means 16 is used where key words or phrases or tone numbers are analyzed, (as opposed to ring types or other signals, dial tones, background sounds, etc.). The system may include, as a part of the phone interface means 3 a data generator 2 for associating telephone communications with call preselected data from a group of data comprising start time, finish time or length. Also, data reader 4 may obtain location numbers, pin numbers, name of user, phone number called, location of origin, etc.

An analog to digital converter 5 is present for converting the electromagnetic signals to a digital format as a digital data pack containing the digital call and the call preselected data in the form of collections of datum. Process steps take the 48 more or less phomes into which language may be separated and utilize alphanumerics to take each phone and turn it into 2 alphanumeric bytes as a part of or along with the analog to digital means.

In this case, a separate voice data base (which could be combined with the ring data base) 14 contains pre-selected voice digital data corresponding to specific words, numbers, area codes, etc. converted to digital data in a desired range of timing and frequency from the various languages are stored. There may be a GUI (graphical user interface) for entering words or numbers into the database as described above.

There may be, in this instance, a pronunciation database means 12 for converting the GUI entered words or numbers into phonic digital data corresponding to at least one pronunciation (or a plurality of pronunciations) for the word. This means is shown as a pronunciation data base 12 for creating digital or analog data corresponding to the sound of the word entered in the GUI interface for comparison to the data in the phone call.

Here, the voice comparing means 16 is a second CPU receiving data from the separator 7 in the controller 3 and comparing the data groups to the phonic digital data and determining if numbers or words in the pronunciation database 12 are present in the call data on the basis of a pre-selected percentage of certainty, which may be based on the amount of comparable datum based on timing and frequency between the Voice digital data and the datum group as an identified group. The comparison may be accelerated as described above so that a real time analysis is possible.

An options database 17 holds options for various words, numbers or DSTM signals containing a pre-selected group of options for a particular word type or data entry from the group of options. The data may be modified by marking the call or the word within the call data. The mark may be made with a digital or analog mark corresponding to the data type (preferably digital data) to associate a particular mark identifying the ring type or word with an identified response. This marking is accomplished by a marking means 23 which is a combination of software and the hard drive storage in the Controller 3 and ASR/VPN voice comparing means 16.

The call may be modified by terminating the call, playing a recorded message in conjunction with the call, forwarding the call, monitoring the call, telling the controller to store the call in a data base with the mark, etc. An output means 9 is present for effectuating the response where the call is modified.

This output means 9 is handled by the controller 3 as described in more detail below.

One set of responses may be to encode and mark the data as described above or to encode the data with an encoding means 20. This may also be handled by the controller 3. A secondary mass storage means 318 is present for storing completed encoded calls.

There may also be a GUI interface on the local area network 327 for obtaining digital data packs or portions of digital data packs based on length from a marked phonic digital data which is operated by a user who typically would not be a call participant.

The voice data base 14 may be a GUI interface prepared list including words, area code, geographic location of called number, name list (last, first, etc.) number of the user, dial tones type, telephone number, number of rings or combinations of these in serial grouping or within a certain time span.

Utilizing this or the other data the output means is instructed from a data base containing a pre-selected group of options for a particular ring type from the group of options comprising terminating the call, marking the call with a marking means 23 for associating a data marker within the call data identifying the ring type with an identified group, playing a recorded message in conjunction with the call, forwarding the call, monitoring the call, or storing the call in a data base with the marker.

In this case, the output means 9 for effectuating the response may include responses withi an output options database 11 which are sent to the GUI interface from the list comprising alerting a listener, dialing a listener, storing the call for the listener, playing back a stored call, playing the call as it is received for the listener, giving at least some of the pre-selected data on the call to the listener (who is not one of the primary parties, caller and person called), conferencing the call to other listeners, and encoding the call either in response to the GUI interface or automatically.

The encoding means 20, which may include a secondary storage 318 for encoded data is further described as an electronic computing system for use in the monitoring and tracking of telephone communications over which users can communicate by means of spoken or GUI commands comprising encoding the call data so that changes to the data make changes from the group comprising: changing a numeric sum based on the data or marking the data to show the change.

The step of encoding comprises the steps of (1) taking the digital data pack (including start and finish numbers, location, pin number, digitally converted analog conversation/ rings, etc.) running an algorithm to select the numbers according to a preselected formula, determining a mathematical equation based on the manipulation of selected numbers from the group comprising (sum, subtraction, multiplication, division, integration, encryption, etc.) according to the selection.

As a part of, or in conjunction with, the telephone means for converting voice signals to electromagnetic signals having wave characteristics there may be a Reading means 4 for reading a biological marker from the group comprising thump print, finger print, retinal pattern, toe print, signature, etc. In the preferred embodiment, this reading means 4 reads finger print data.

There is also a database 5 viewable directly or indirectly by the comparing means within the controller 3 or within reading means 4 along with data from the biological marker reading means 4 which database 5 contains stored copies biological person specific markers and associated PIN numbers. There is, inherent in the comparison means, which may be incorporated in the reading means 4, a method for comparing the biological market to the database of stored copies.

The controller 3 may contain a pre-selected group of options, in the options database 11, for a particular person identified by biological marker, PIN or credit card from the group of options comprising initiating the call, terminating the call, marking the call with a mark means for associating a marker identifying the ring type with an identified group, playing a recorded message in conjunction with the call, forwarding the call, monitoring the call, storing the call in a data base with the marker.

This would work along with the data bases as described above containing a pre-selected group of options for a particular PIN number (or biological marker) from the group of options comprising terminating the call, marking the call with a marking means for associating a marker identifying the ring type with an identified group, playing a recorded message in conjunction with the call, forwarding the call, monitoring the call, storing the call in a data base with the marker, etc. and the output means 9 for effectuating the response.

Figure 7:
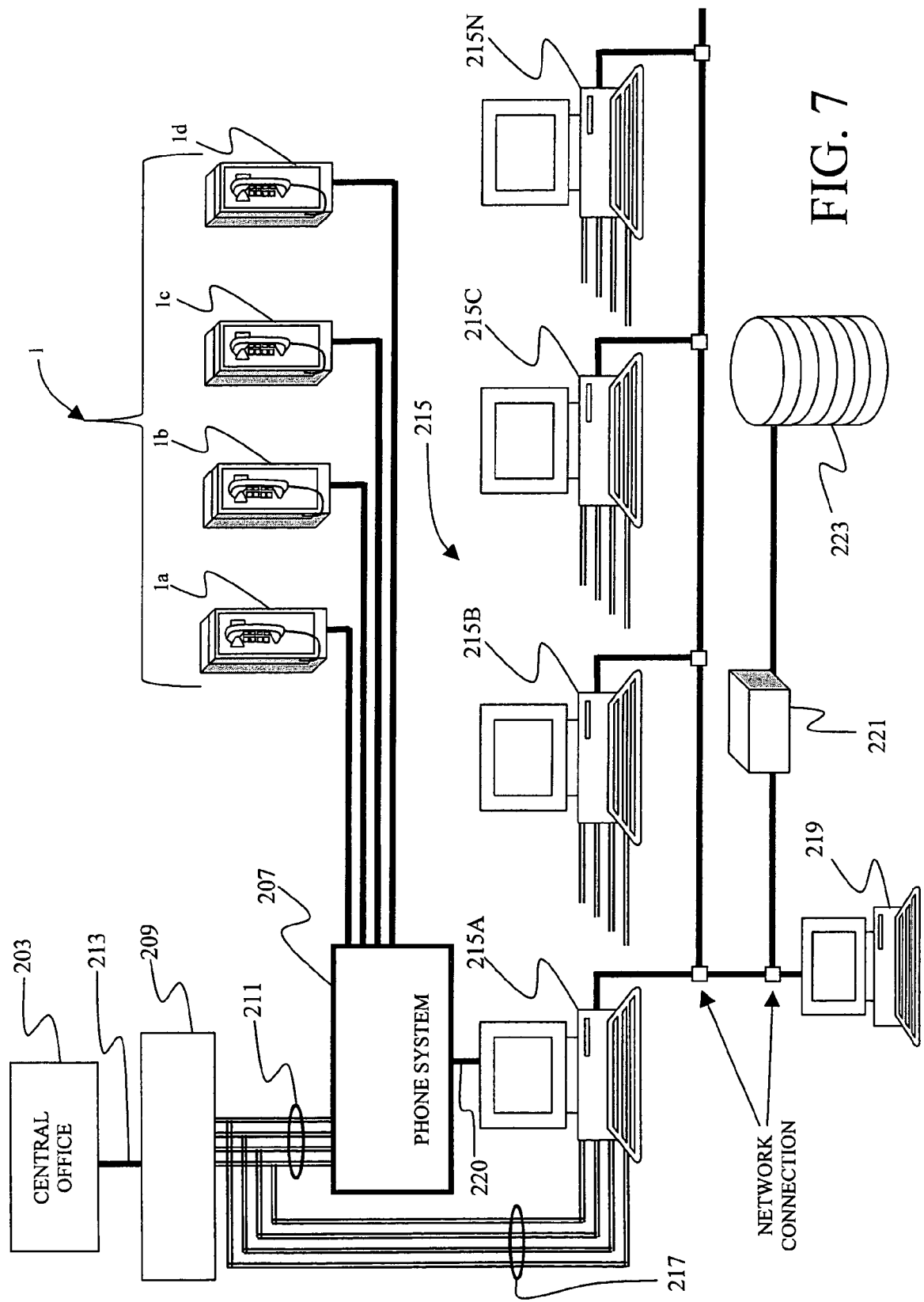
FIG. 7 is an alternate schematic block diagram of a phone system arranged in accordance with the invention.

FIG. 7 shows the previous method depicting a telephone apparatus as including central office 203 located remote from the facility. At the facility, a plurality of telephones 1, here 1a, 1b, etc. are connected to phone system 207. Switching system 209 schematically depicts a centralized switching system and associated hardware and software of a telephone company which provides a plurality of outside telephone lines to phone system 207 for accessing the PSTN. One telephone line 213 schematically represents the connection of phone system 207 to central office 203 via the PSTN.

Phone system 207 is connected to recording system 215 (items 215a, b, c, etc). Recording system 215 is a multiple channel type and each channel is connected by one of lines 217 to one of the external lines 211. Recording system 215 has a master recording unit 215A usually with a maximum capacity of around 48 channels. If additional capacity is required, then units 215B, 215C . . . 215N(N being any integer) can be added, each of which adds a 48 channel capacity.

Workstation 219 is networked to the recording system 215 as well as to file server 221. File server 221 is a PC with its own storage device such as a hard disk of specified capacity. However, mass storage 218 for file serve 221 is available in the form of a readable/writeable optical juke box.

One implementation available for phone system 207 is Guardian 1600 available from Schlumberger Global Tel*Link in Mobile, Ala.

Master unit 215A of recording system 209 utilizes a PC.

Each of units 215B . . . 215N of recording system 215 has the same hardware and software as master unit 15A, except that its software is configured to operate as a slave.

Workstation 219 is a PC with a processor.

File server 221 is a PC based Novell 3.12 server or a Windows NT 3.51 server, with a 1 Gig or larger capacity hard disk and a mass storage device, namely optical juke box 223.

Juke box 223 is model number MaxLyb26XT available from MAXOPTIX Corp. of Fremont, Calif. Its storage capacity is 26 Gig, but other sizes are available.

The network is Ethernet.

In one embodiment of the invention, phone system 207 is connected to recording system 215 by line 220 in the form of an RS-422 connection. This connection is used for the purpose of transferring call-related data from the phone system 207 so that it can be compared with recording control data obtained from file server 221 to determine whether or not a phone conversation will be recorded. Further details in this regard are provided below. For another embodiment of the invention, phone system 207 and recording system 215 are not connected by line 220. Instead, call-related data is obtained by recording system 215 from outside lines 211 via lines 217. Further detail on this embodiment are provided below.

Figure 2:
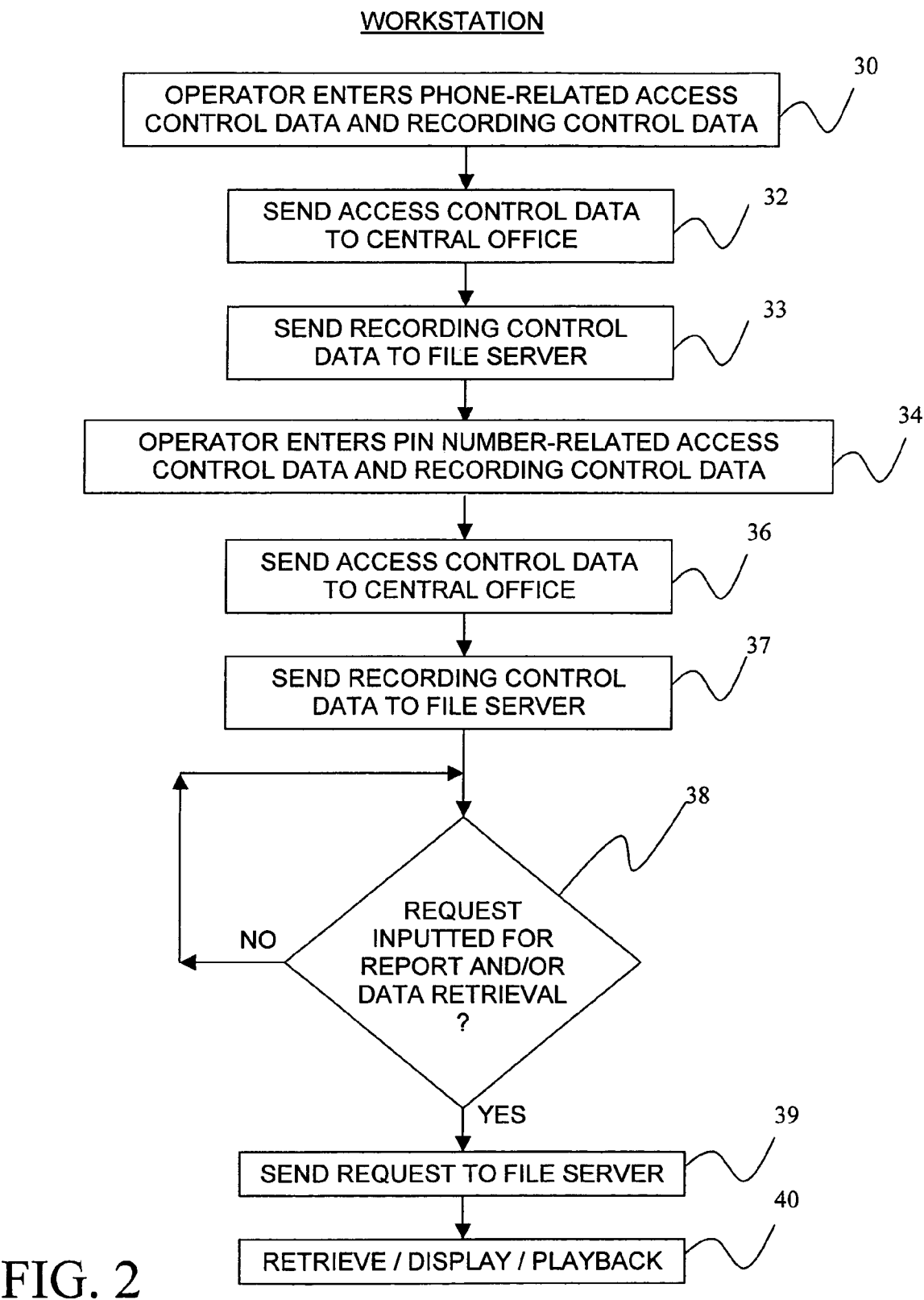
FIG. 2 is a flow chart for operating the work station of FIG. 1.

FIG. 2 is a flowchart for operating workstation 219 shown in FIG. 7. The operator of workstation 219 enters access control data which is to be utilized to conduct a validation check when an inmate picks up a telephone to place a call. The access control data is of two types, namely phone-related and PIN number-related. This workstation corresponds to one of the GUI interfaces 331, 327 described above in reference to FIG. 1B in the alternate embodiment described in FIG. 1B.

The phone-related data is used to determine whether the telephone is active so that a call connection can be made, independent of the particular inmate that is placing the call. Thus, it may be desirable to have a particular phone, or a group of phones such as those in a particular cell block, controlled so that calls can only be placed therefrom during certain hours of the day and only on certain days (e.g. days of the week, weekends, holidays). Moreover, a maximum duration for each phone call placed from that phone can be set so that a phone is not monopolized by one call.

In addition to entering the access control data, the workstation operator must enter the recording control data which determines whether or not particular phone conversations will be recorded. The recording control data can also be of two types, namely telephone-related and PIN number-related. With the telephone-related recording control data, it is possible to record calls made from particular ones of telephones 1 based on such parameters as the origination number, destination number, time of day, day of the week, etc. Of course, this is independent of the identity of the particular inmate placing the call. However, it may also be desirable to record conversations depending on which particular inmate is placing the call. For this purpose, PIN number-related data is entered in association with the inmate PIN number.

The phone-related access control data and recording control data are entered per step 30 when the phone system of a facility is installed and as the need for changes occur.

This phone-related access control data is transmitted to central office 203 per step 32. This can be done either on a real time basis as each change is made, or it can be done as a batch transmission for a plurality of changes and done at predesignated times, such as during off hours. The access control data is store in the central office 203 for carrying out the phone-related validation.

In step 33, the phone-related recording control data is sent to file server 221 from where it is retrievable by recording system 215. The retrieved recording control data are entered per step 30 when the phone system of a facility is installed and as the need for changes occur.

This phone-related access control data is transmitted to central office 203 per step 32. This can be done either on a real time basis as each change is made, or it can be done as a batch transmission for a plurality of changes and done at predesignated times, such as during off hours. The access control data is stored in the central office 203 for carrying out the phone-related validation.

In step 33, the phone-related recording control data is sent to file server 221 from where it is retrievable by recording system 215. The retrieved recording control data is used for determining whether a call conversation should be recorded, as discussed above and explained in further detail below.

PIN number-related access control data and PIN number-related recording control data are entered upon the admission of an inmate, per step 34. Each inmate is assigned a PIN which is a unique multi-digit number and/or alphabetic characters. Additional data is entered in association with the PIN number to control access by that inmate to telephone privileges based on such parameters as time of day, day of the week, weekend/holiday, and so on. In addition, restrictions can be placed on the maximum duration of any phone call made by that inmate as well as on the total amount of telephone spent by that inmate on calls made per day, per week, and so on. It is also possible to control the particular destination numbers to which the inmate can have access. This can be done by either storing a list of telephone numbers which are the only numbers to which the inmate can place calls, or allowing the inmate to call any number except for a list of numbers that are stored to which access will be denied. All of the access control data is manually entered by the operator into the workstation 219 and stored there.

Step 34 also depicts the entry of the PIN number-related recording control data. The recording control data that is PIN number-related provides control based on such parameters as the destination number, origination number, time of day, day of week, etc.

It is also important to inhibit recording of certain phone conversations for legal reasons and perhaps other reasons as well. For example, calls made by an inmate to his attorney are considered privileged and, thus, recording thereof is forbidden by law. Thus, the recording system must be set up so as to avoid having a call made to that particular destination number recorded.

Once the PIN number-related access control data is entered, it is sent to central office 203 per step 36. This can be done in real time or by batch processing.

The PIN number-related recording control data is sent to file server 221, per step 37.

When it is desired to retrieve information from file server 221, workstation 219 is utilized for this purpose. Such information can be, for example, in the form of a report or it can be a recorded phone conversation. Examples of reports that can be provided are those sorted by any one of the following: origination number, destination number, PIN number, frequency, call duration, and group of phones (e.g. by cell block). The information included in the report is that used for sorting and any and all other call data fields that are available by virtue of having been stored.

The applicable search parameters are entered into workstation 219 to form a request when retrieval of a recorded phone conversation is desired, as per step 38. As will be explained in greater detail below, each phone conversation is stored along with any or all of the call-related data, and possibly other data, and the search parameters that can be used correspond thereto. This includes the origination number (i.e. the telephone number from which the call was placed), the destination number, the PIN number, the time of day and the day of the week, the date, and so on. The search request, as based on the search parameters that are specified by workstation 219, sent per step 39 to the file server 221 which carries out the search through the conversation data that is stored in juke box 223. An advantage of having such a mass storage device is the convenience of being able to search through such a massive amount of data without having to interrupt the search by removing one storage medium, such as a hard disk or tape, and replacing it with another. This provides the requested data instantaneously.

A report of all of the phone conversations that fit the designated search parameters is prepared by the file server and can be called up for display by workstation 219. A decision by the operator can then be made as to which one of the listed conversations is to be played back. Once such a selection is made, such as by clicking on the desired call of interest, the file containing the conversation data is retrieved from juke box 223, and transferred to work station 219 which is provided with audio capabilities. The conversation data is then utilized for audio playback purposes so that the recorded phone conversation can be listened to. Step 40 generally depicts the retrieval of data by workstation 219 and the display thereof (in the case of a report) and/or playback thereof (in the case of a phone conversation).

Figure 3:
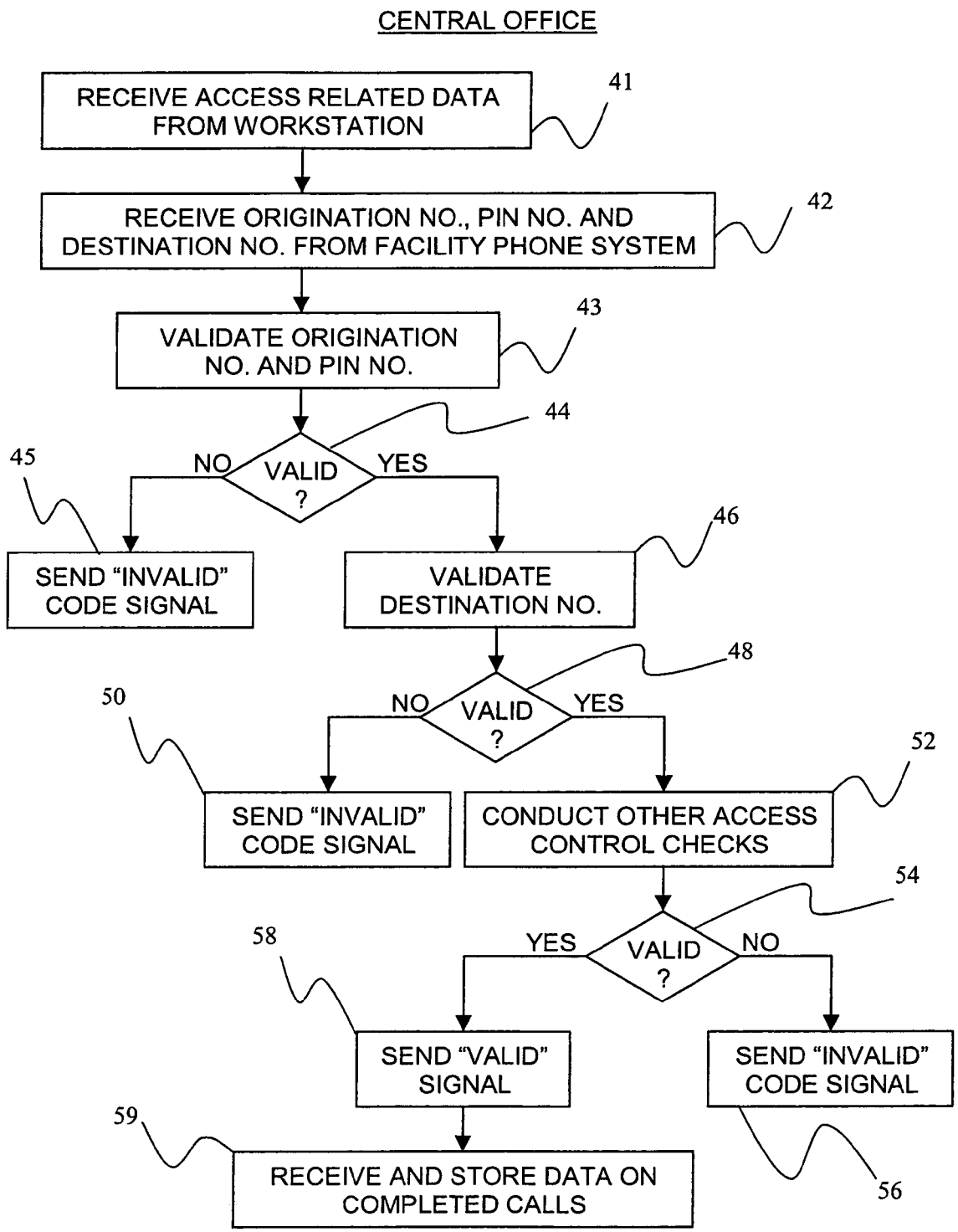
FIG. 3 is a flow chart for operating a central office with which the phone system of FIG. 1 communicates and interacts.

FIG. 3 is a flowchart for central office 203. In step 41, the central office receives from workstation 19 all of the access related data that was stored by the operator. This includes phone-related data and PIN number-related data originally derived from steps 30 and 34 of FIG. 2. This data is permanently stored in central office 203 and available for use as part of the validation check. When an inmate attempts to place a call, the number of the telephone being used (origination number), the inmate's PIN number and the destination number are transmitted to central office 203, as per step 42.

Step 43 checks whether or not the particular telephone being used is active and whether the inmate identified by the PIN number has access to telephone privileges at that particular time and under the then prevailing conditions (e.g. maximum total calling time per day not exceeded). Based on the result of step 43, step 44 determines whether the origination number and PIN number are valid. If not, then step 45 sends an "invalid" code signal to phone system 207. A particular code is used depending on the reason for the invalid status. As a result of receiving such a code, a suitable message will be produced by phone system 207 to inform the inmate that the attempted call is being denied. In addition, the message explains the reason for the denial (i.e. depending on the code, either that the particular telephone is not available at that time or that the telephone privileges for the PIN number are not then available.).

If the validity of the origination number and the pin number checks out per steps 43 and 44, then the destination number must be validated as well. The destination number is received from phone system 207 by central office 203 together with the origination number and PIN number as part of step 42. The destination number is checked, per step 46, by reliance on a service provider utilized for this purpose (e.g. SNET, TNS). These service providers maintain a data base which can be used for the purpose of verifying that the destination number is billable. Thus, central station 203 accesses the service provider, such as via modem, to request this information. If step 48 indicates that, based on step 46, the destination number is not billable, then, per step 50, a unique code signal is sent by central office 203 to the phone system 207. Phone system 207 will respond to receipt of such a code by producing a suitable message to inform the inmate of the problem behind the call being denied. If, however, step 48 indicates that the destination number is billable, then step 52 conducts other access control checks. One such check is whether a dollar threshold of calls billed by this PIN number to a particular telephone number has been exceeded per specified period (e.g. a one month billing period). Another check is whether a maximum limit on the number of calls by one PIN number has been exceeded in, say, 24 hours. A further check determines whether a threshold of collect call refusals by one particular telephone number for calls attempted by this PIN number has been exceeded. This is designed to avoid annoyance calls. If step 52 determines that, based on step 52, the call should be denied, then step 56 sends a unique "invalid" signal to phone system 207 which will trigger an appropriate voice message. If, however, step 54 validates the cal, then step 58 sends a "valid" signal to phone system 207 which will enable the call to be connected, thereby granted access for the inmate to the PSTN.

Finally, step 59 of FIG. 3 represents the receipt of completed call data from phone system 207. This data includes the origination number, the PIN number, the destination number, the date, the start time of the call, the completion time, the duration, etc. This completed call data is stored by central office 203 and is used for billing purposes, for example. It is sent upon completion of the call or as a batch transmission, depending on how quickly the information is needed at the central office.

Figure 4:
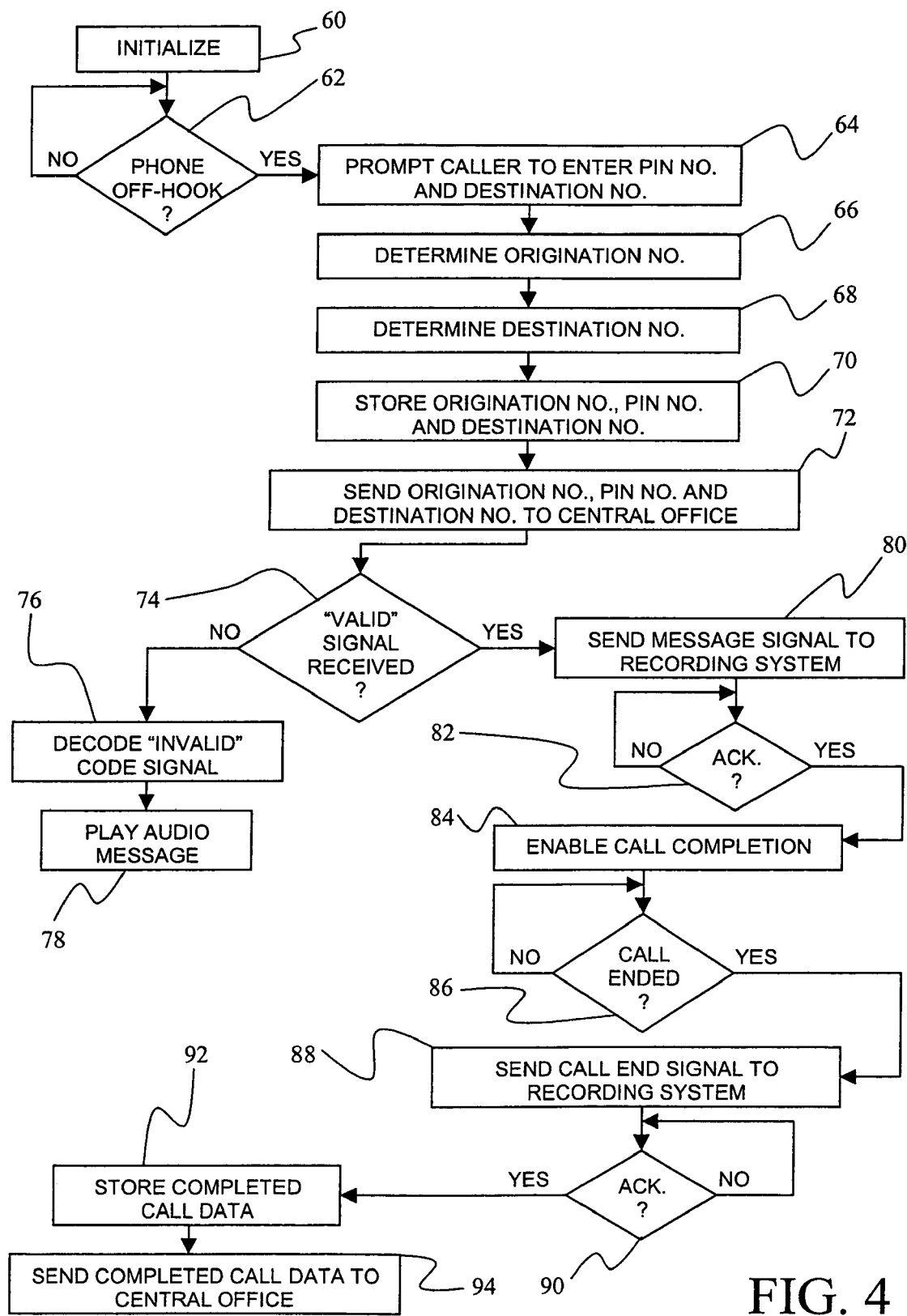
FIG. 4 is a flow chart for operating the phone system of FIG. 1.

Turning now to FIG. 4, it is a flow chart for phone system 207. Step 60 represents initialization of the system such as, for example, by entering time of day and date. Various other operations can be included in step 60 which are required to place the facility in a mode in which telephone access to the PSTN is available via phone system 207 through use of telephones 1, 1a, and 1b. In step 62 a determination is made whether one of phones 1 has been taken off hook. If so, phone system 207 produces audio (e.g., voice) prompts to inform the inmate that his PIN number and the destination number must be entered, and how to do so (e.g., depress the * key after each number). Step 64 generally represents all such prompts, although it should be understood that a separate prompt can be used after each number is entered. The origination number is determined per step 66. Phone system 207 "knows" the origination number because it detects which of the lines from its telephone 1a has gone off-hook, and because a stored table relates each line to a particular telephone number.

The inputted destination number is determined by the phone system 207 per step 68. This is done by detecting the DTMF tones produced by the telephone and converting them to the corresponding numbers. The technique for performing this conversion is well known and, therefore, no details are deemed necessary. Step 70 stores the origination number, PIN number and destination number. Once all of the call-related data has been obtained and stored by phone system 207, step 72 initiates a communication mode with central office 203 and sends the origination number, PIN number and destination number thereto. Step 74 determines whether a "valid" signal has been received from central office 203 indicating that the origination number, PIN number data and destination number have been validated by the central office. If not, then based on which of the "invalid" code signals has been received from central office 203, as determined by step 76, a suitable audio message is played per step 78 to inform the inmate of the problem. If, however, the "valid" signal is received, then step 80 sends a call-start signal to the recording system 215. In addition, the call-related data that has been stored by phone system 207 is provided to recording system 215 as part of an electronic message signal that also includes call start signal, for reasons to be explained in detail below having to do with whether or not the conversation of this phone call will be recorded. Step 82 then awaits receipt of an acknowledgment signal from recording system 215 that the call start signal and the call-related data have been successfully transferred. If no such acknowledgment signal is received within a given period of time, then the message including the call-related data and call start signal will be re-transmitted. If no acknowledgment signal is received despite several attempts having been made (a maximum number of attempts is set to avoid an endless loop), then the call will be blocked and a suitable audio message will be played, such as that the system is temporarily out of order. (This step is not shown to keep the drawing from being unduly complex.)

If an acknowledgment signal is received, then step 84 allows the call connection to be completed so that a phone conversation can take place. Following the initiation of the conversation, step 86 monitors whether the call has ended, or been terminated. This step can include monitoring whether the phone is placed on hook as well as monitoring the access control data which sets a maximum duration for a call placed from this telephone and/or by this inmate. Thus, if the telephone has not been placed on hook, at a specified time (e.g. 60 seconds) before the call is due to be terminated, phone system 207 provides an audio warning message in the form of a beep or by voice. (This step is not shown.)

Step 88 sends a call end signal to recording system 215 once the call is ended by the phone being placed on hook or by termination due to one of the designated time limits (e.g. call duration, total calls duration) having been exceeded. Step 90 determines whether an acknowledgment signal from recording system 215 has been received. If not, then another attempt (a maximum number of attempts is set to avoid an endless loop) is made to send the call end signal. Once the acknowledgment signal is received, then step 92 stores the completed call data. In step 94, phone system 207 moves the completed call data to central office 203 at a suitable time (real time or batch).

Figure 5:
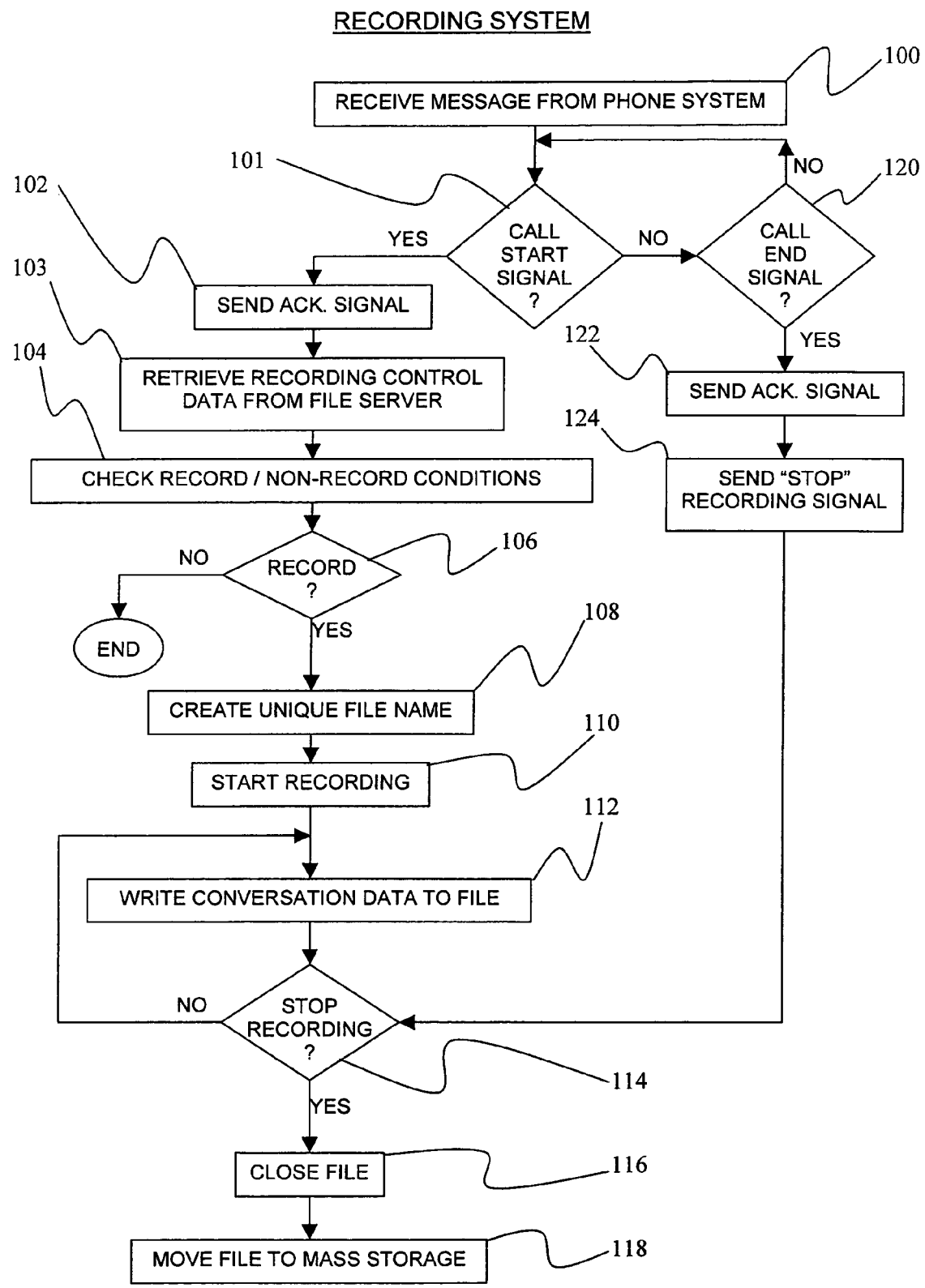
FIG. 5 is a flow chart for operating the master recording unit of the recording system shown in FIG. 1.

A flow chart for recording system 215 is shown in FIG. 5. Step 100 receives the message signal produced by step 80 (FIG. 4). Step 101 determines whether a call start signal has been received from phone system 207 as part of the electronic message signal. If it has, then step 102 sends an acknowledgment signal to phone system 207. Step 103 retrieves the previously stored recording control data from file server 221. Of course, the retrieved data is pertinent to the origination number and PIN number. Step 104 then conducts a comparison between the recording control data that it receives from file server 221 and the call-related data that it receives from phone system 207. Based on this comparison, step 106 determines whether the conversation should be recorded. If not, then the operation comes to its end. If, however, it is indicated by step 106 that the conversation of this phone call should be recorded, then step 108 creates a file identified by a unique file name. Step 110 records the conversation data which is written to the just-created file, as per step 112. Step 114 then monitors whether the recording of the conversation data should be stopped. If not, then the writing operation of step 112 continues. However, if the recording is to stop, for reasons explained below, then step 116 closes the file which is then migrated, per step 118, to the server with its mass storage.

Returning now to step 101, if a signal is received from phone system 207 but it is not identified as a call start signal, then step 120 checks whether it is a call end signal. If it is, then step 122 sends an acknowledgment signal to phone system 207 and also sends a stop recording signal, per step 124, to recording system 215 to affect step 114.

Figure 6:
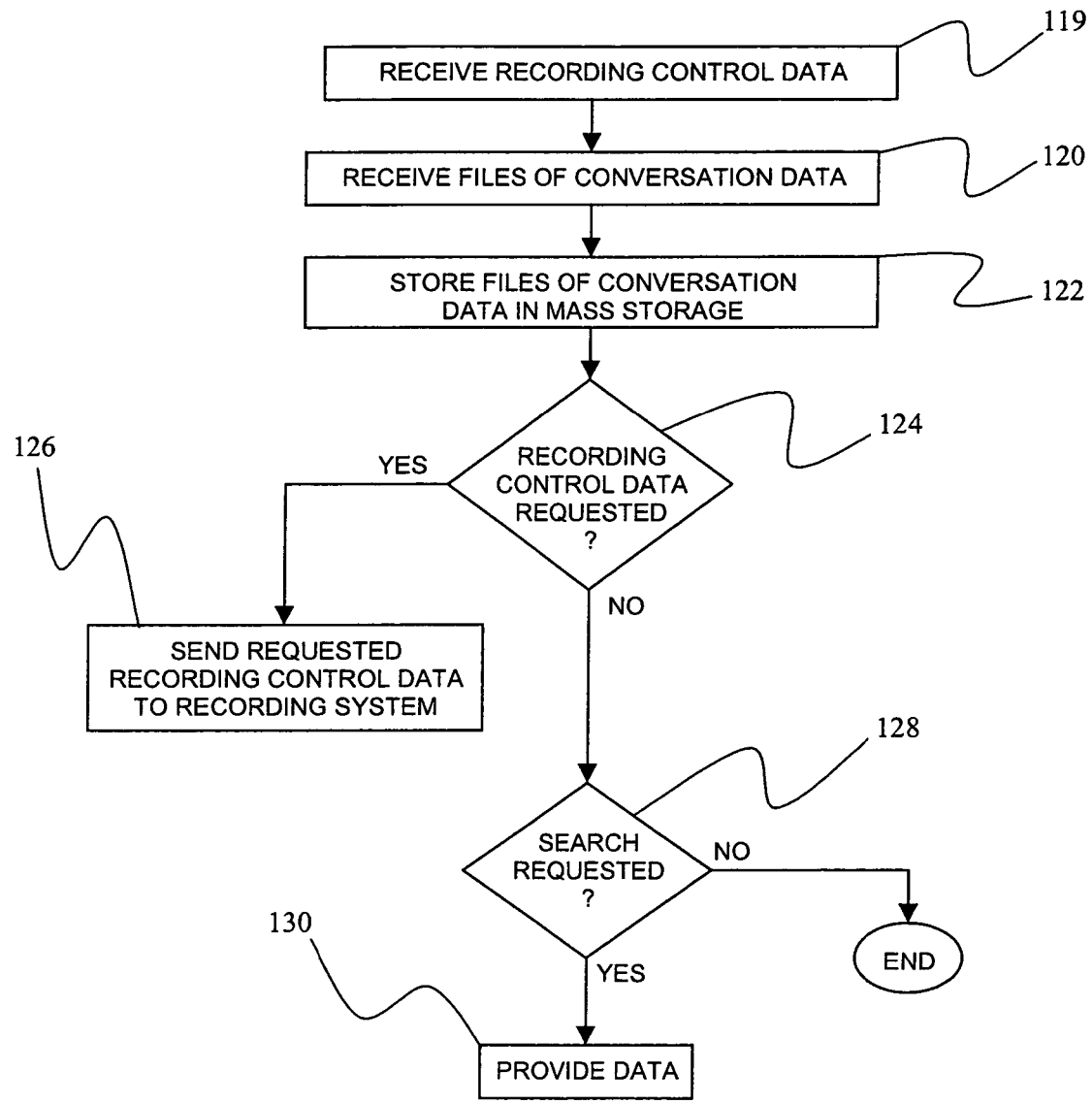
FIG. 6 is a flow chart for operating the file server of FIG. 1.

FIG. 6 depicts a flow chart for file server 221. Specifically, step 119 receives and stores the recording control data from workstation 219. In step 120, file server 221 obtains the files of telephone conversations recorded by recording system 215. Such files include the file name, the conversation data stored therein, and the call-related data associated with that particular call. The files are stored by file server 221 in the mass storage juke box, as per step 122. If step 124 determines that recording control data has been requested by the recording system 215, step 126 retrieves and sends it. If step 128 determines that a request has been obtained from workstation 219 for a report or a designated phone conversation as per particular search parameters, file server 221 carries out the search and provides the data as per step 130.

In a second embodiment of the invention, no direct connection is provided between phone system 207 and recording system 215. In other words, line 20 (FIG. 1) is not used. Such a situation will arise when a phone system 207 already exists before the remaining components of telephone apparatus 1 are obtained, and compatibility may be a problem. With such an arrangement, it is not possible to provide all of the access control data to the recording system from the phone system. Thus, the destination number and PIN number entered by the caller cannot be fed to the recording system. However, although the PIN number (and of course the origination number) cannot be provided to recording system 215, the destination number can be derived from the DTMF tones via lines 217. Thus, control of whether or not to record can be based on the destination number and, of course, other parameters readily available to the recording system, such as date, day of the week, time of day, etc. Based on these parameters, steps 103, 104, 106, 108, 110, 112, 114, 116, and 118 of FIG. 5 can be carried out. Of course, step 114 will not be based on receipt of a call end signal from phone system 207 but, rather, on sensing that the phone has been placed on-hook.

Although a detailed description of preferred embodiments of the invention has been provided above, various modifications thereto will be readily apparent to anyone with ordinary skill in the art. For example, incoming calls can also be handled by the telephone apparatus by using the "caller ID" feature to determine the telephone number from which the incoming call was placed. That data can be used to control access as well as whether to record the conversation. Also, the validation check as to one or more of the origination number, PIN number and destination number can be done at the facility rather than at the central office. In addition, the capability for prepaid calling can be provided. More specifically, rather than handling the outgoing calls on only a collect call billing basis, each inmate can prepay a certain amount into an account. Then, validation step 46 (FIG. 3) can be replaced with a check on the balance left in the inmate's prepaid calls account. If insufficient funds remain, the call is denied. Also, if the balance is exceeded during a call, the call could be terminated. Moreover, another possible modification involves the situation if a destination number is dialed more than a preset threshold of times, that destination number will be automatically recorded thereafter. Another modification is to add a self-learning capability so that some data can be entered automatically into the system rather than being inputted manually. For example, rather than manually entering a list of telephone numbers that the inmate is permitted to call, this list can be generated automatically by including in it all the numbers called by that inmate during a given period (e.g. one month).

An alternative embodiment of the invention disclosed above moves several of the functions from the remote location to a local computer system which allows the same functions between a local cpu and a centralized cpu but utilizes the division of functions as shown in FIGS. 8 and 9.

Referring to FIG. 8, it can be seen that like the embodiment in FIG. 7, the device has a bank of telephones 1, comprised of one or more phones 1a, 1b, etc. These are joined to a local telephone system 13 which is, in turn, connected to a central control station 203. In this embodiment, the phone system 13 is handled by a central processing unit (CPU) Controller 3 utilizing a series of voice modems 300 or comparable communicating devices joined together by a BUS 310 and controlled by the controller 3 as described in more detail in the discussion of FIG. 9 below.

The CPU also communicates with several work station GUI's 328 through a local area network 327 and to the telephone service provides or telephone company 335 through voice modems 300. Current BUS technology allows for several voice modems 300 to be controlled by a single CPU (central processing unit), here Controller 3.

Referring to FIG. 9, the Controller CPU Controller 3 has a communications bus 310 which receives voice modems 300. These are powered by the controller supply power 301. This bus 310 powers the phone bank 1 and receives analog or digital data from the phones 1a, 1b, etc. in phone bank 1. In the prior example, the invention utilized a network of recording systems. This is replaced with multiple voice modems 300 connected into the bus 310. Individual multi-wire lines run from the individual voice modems 300 to the individual phones 1a, 1b, etc in the phone bank 1 as known in the art for individual phones. The modems and phones used here have connections designed to receive these phone lines as is known in the prior art although this novel arrangement as taught alternatively in the description of FIG. 7 is not known.

The power supply 301 for the Controller CPU provides the power for the CPU Controller 3 and the modems 300 through the bus 310. Another high speed digital data modem 303 communicates the CDR record of the phone call and receives billing and data messages from the central control unit 203.

One or more network cards 321 within the controller 3 communicate with the local area network 327 which in turn allows the cpu Controller 3 to communicate with the GUI units 328 on the local area network 327. Software and hardware within the Controller CPU include digitizing means analog to digital converter 5 for taking analog signals from the phone bank 1 and other data generators and turning them into digital signals for storage within the controller 3 and comparison purposes described below.

Least call routing determines the lowest cost for an outgoing call. Here, the determination is made by sending the preliminary CDR record [record of what call is being placed] via high speed digital modem 303 to the central control unit 203. This allows several phone systems 13 at different locations to rely on call data maintained at a single location. An alternative would be to have information on least call routing to be periodically received by each of the phone systems 13 from the central control unit 203 in the form of electronic data packages which are used for updating software. The central control unit 203 provides call information correcting the dial string (the numbers which place the call through the telephone company to minimize the cost) and possibly providing information on what output option to use if any of the database of output options is located at the central control unit 203 where they may be divided between the controller and the data in a central CPU unit 203.

Yet another interface from the Controller CPU is the Controller GUI, here keyboard 331 and display 332 interface which allow the user to directly access the Controller CPU and monitor information from the Controller CPU.

Either the Central Control Unit 203 or the Controller CPU Controller 3 has software to select responses and a database of recorded messages 305 to the various conditions to which the system is programed to respond as set forth above. The same voice modems 300 can be used to take these messages (which may first be converted from digital to analog format using software and hardware analigous to the analog to digital means analog to digital converter 5) and send these to the telephone company 335 or to the phone bank 1 depending on where the message must be sent prior to completing the call.

The Controller CPU Controller 3 has a limited capacity hard drive storage means 307 (a part of the interface 3 for receiving and storing data described with reference to FIG. 1a) which stores ongoing call data while it is processed and while the call is on-going. Also incorporated within the Controller CPU Controller 3 is one or more data generators 2 which generate time and date (using a clock and calendar within the computer and timing software 313) data which is utilized to mark the call and to determine it's length for billing purposes as described in more detail in the process descriptions of FIGS. 10–14 below. Also, there are databases, as described above, with information giving the location of the call and identifying the user with a PIN or other identifier utilizing identification association software as described above and in the process descriptions which follow.

Data is typically split into a filename and content database 316 which contains all of the digital information relating to what is said in the call and filename and call data record database (CDR) 317 which is sent to the central unit 203 for billing purposes. The data is also copied to the RAID mass storage unit 318 as described below. The RAID contains the file name, to allow cross referencing to the CDR 317 and content. It may also maintain separately, to provide quicker and more confidential access, the filename associated with the CDR data comprised of the date, time, length of call, PIN number or other identifier, phone location where the call was placed, how the call was terminated, how the call was billed (debit or credit or collect or cash are typical examples) how the call was accepted, who was called and the location of marked items and the nature of the marked items.

The data within the Controller CPU Controller 3 is mirrored utilizing a mirroring means 302 of software and hardware within the controller 3. A network card 333 in the controller CPU Controller 3 communicates with a mass storage or RAID array 318. This mass storage 318 is large enough to take all of the data from several calls and store them indefinitely. This RAID 318 may communicate with an optical storage unit 23 as described above, although in the preferred embodiment, this is unnecessary. Mirroring of data within the RAID 318 may be accomplished in the same manner as that handled in the Controller CPU Controller 3.

The voice data in the digital format is sent, here by a network card 333, to the ASR (auto speech recognition) means which is the voice comparing means 16 which recognizes keywords by comparing the digital information of the telephone call from the phones in the phone bank 1 to a database of key words, voice database 14, and marks where the keywords are located within the digital voice data. The ASR comparing means 16 may also tell the controller 3 to take certain actions depending on instructions associated with one or more keywords as determined by a user at a GUI interface which may be on the LAN 327. In the preferred embodiment, these actions are taken by the Controller 3 based on what is identified by the ASR comparing means 16.

Here the ASR is a combination of speech recognition software and a CPU. This ASR function may occur in real time or on recorded data. The data may come directly from the Controller 3 if the data is analyzed in real time or from the MASS storage means 318 if it is analyzed historically. The nature of the analysis is determined by the commands entered by the user through one of the GUI interfaces described above.

The ASR comparing means 16 may also act to determine the nature of DTMF signals. Based on the identification which occurs, the Controller 3 may take certain steps as outlined above. Any of the ASR functions may be handled by hardware and software within the Controller although economies of time are recognized by having the voice recognition functions handled separately from the communications functions given the amount of data which must be processed in real time voice analysis.

It is the function of the central control 203 to communicate through the voice modems 300 with the telephone company 335. This may be done through the Controller 3 as a call placing computer which connects and communicates with the telephone network by way of the voice modems 300 using strings supplied by the central control 203.

Once the data has been processed, it is marked, encoded and permanently stored.

FIGS. 11 through 14 show the process steps in practicing this invention including structural elements where necessary for a complete understanding of the invention.

Figure 11:
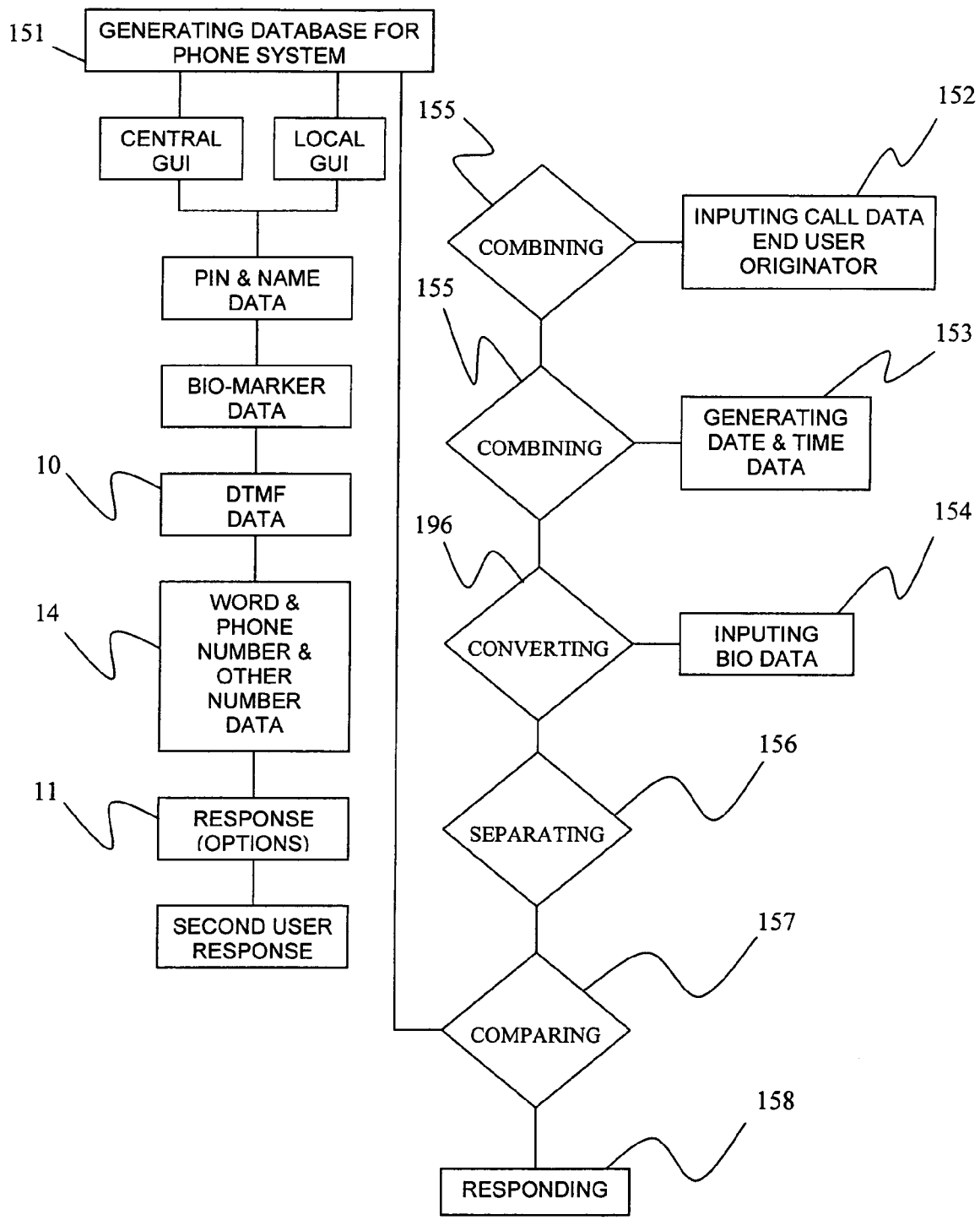
FIG. 11 is a flow chart for the call monitoring function.

Referring to FIG. 11, it can be seen that an initial step to practicing the invention is generating options databases 151 which the process will utilize in order to determine what actions to take. These databases include PIN and Name Data, Bio-marker Data, DTMF Data, Word and Phone number and generic number data, Response option data, and Second user response data. While these data types are subject to sub-grouping or regrouping, for purposes of the process discussion which follows, they are identified separately in this fashion.

Once the system has sufficient options to function, the next step is inputting call data 152 from the end user originator of the system, typically a prison inmate. Simultaneously, the step of generating Date and Time data 153 occurs. This is typically accomplished by a calendar-clock combination internal to the Controller CPU. The step of Inputting Bio-marker data 154 may be a pre-requisite to the call data 152 or may occur during the process at this stage.

While the exact order of these processes is subject to some variation, the step of combining the data 155 and then converting the analog data to digital data 196. If some of the data originates as digital data, it would be combined after the conversion. The next step is separating the data 156 for analysis follows the accepting of the data. The types of analysis occur at two different locations. One is the controller unit and one is the central unit. The central unit initially only handles billing and call placing functions.

The next step is comparing 157 the data to the data generated in step 151. The system then engages in responding 158 based on the comparison of actions.

Figure 12:
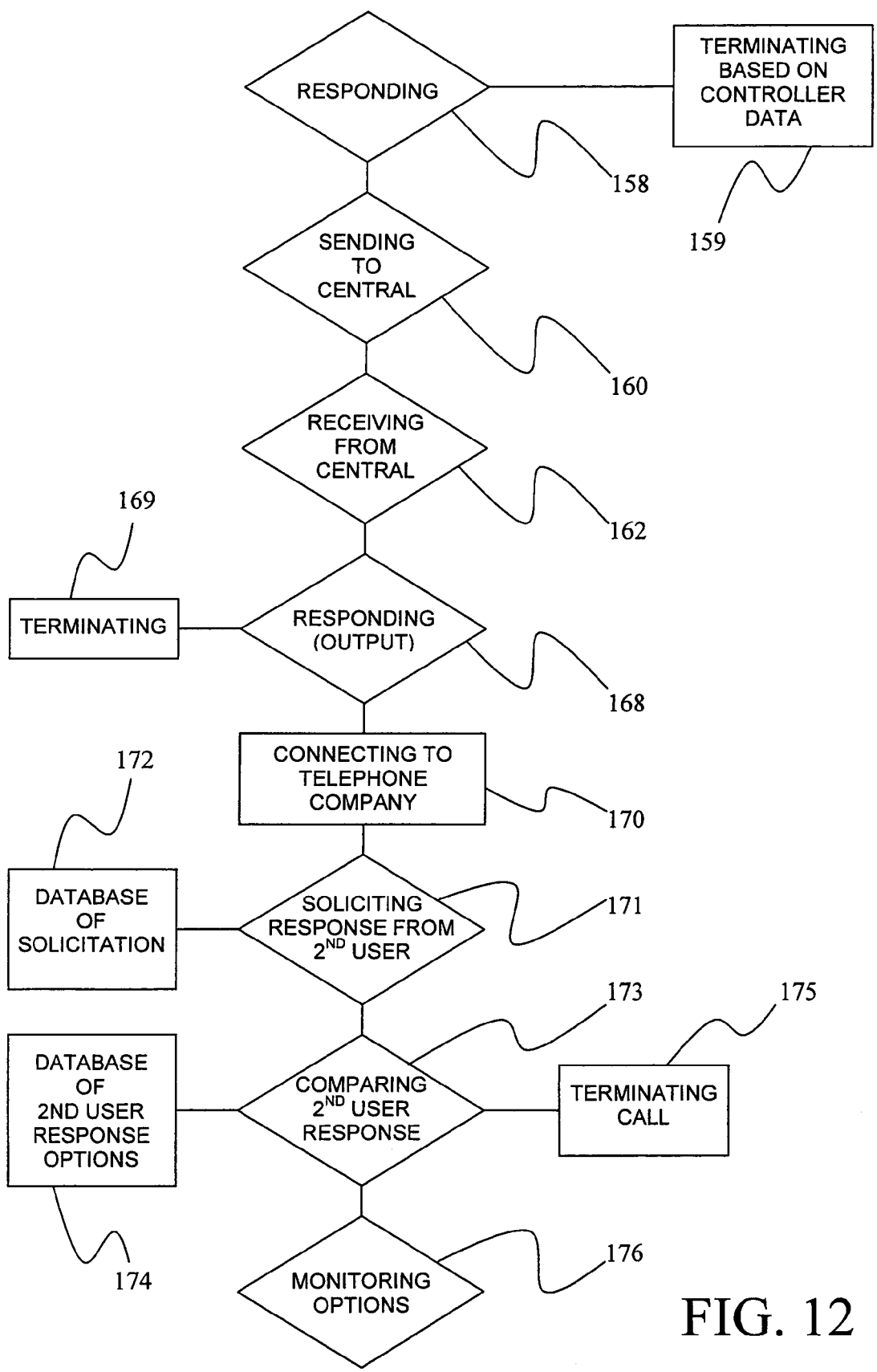
FIG. 12 is a detail flow chart for the responding function for the flow chart shown in FIG. 11.
Figure 13:
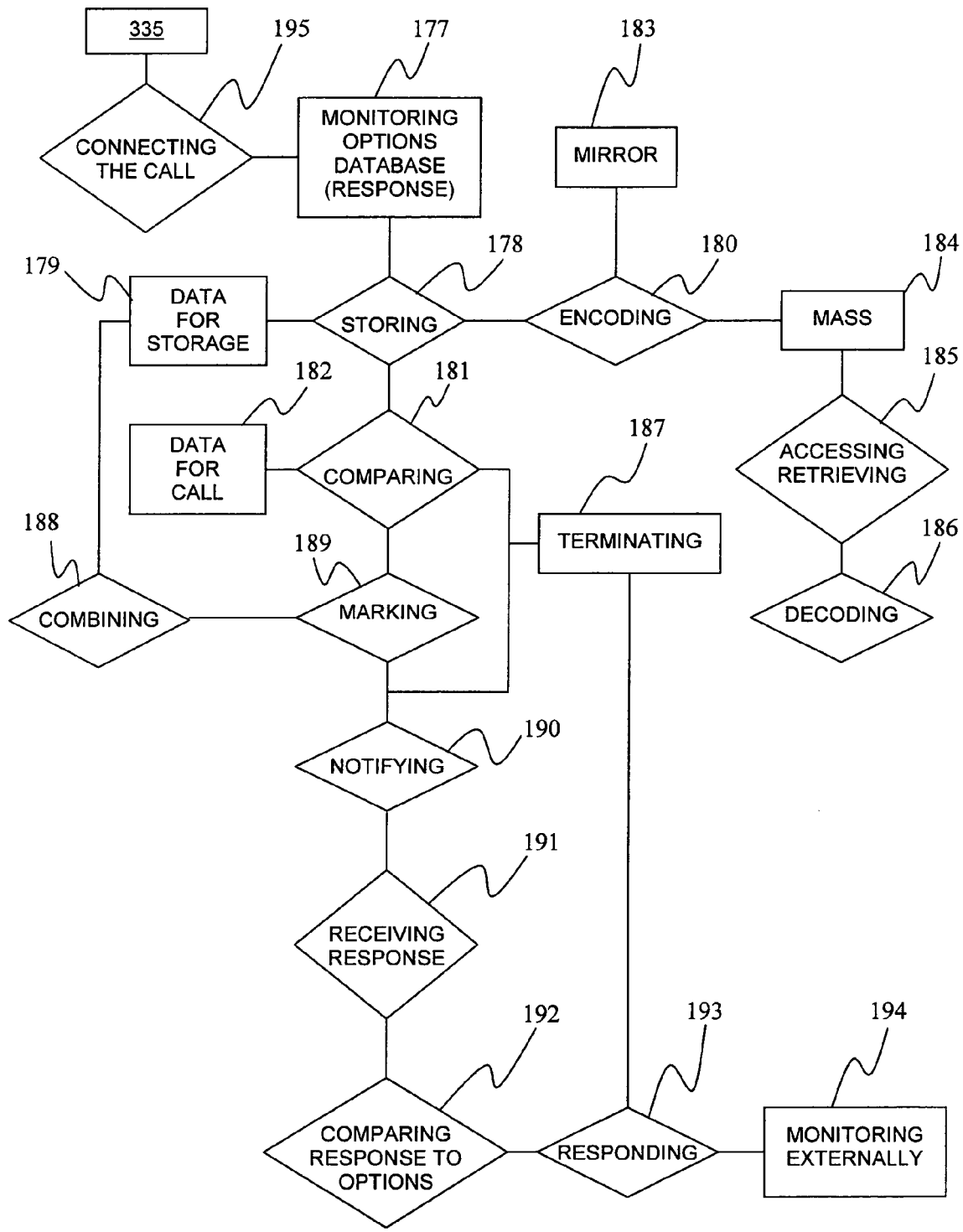
FIG. 13 is a flow chart for the monitoring function of the flow chart shown in FIG. 11.

FIG. 12 shows the steps associated with responding which include terminating the call 159 based on information held in the controller data or sending the call information to the central processing location 160 for placing the call. This function may be moved to the local computer, but for purposes of the preferred embodiment, this is handled at a remote facility. This information is retained for billing information and is supplemented at the termination of the call with the termination information.

Figure 14:
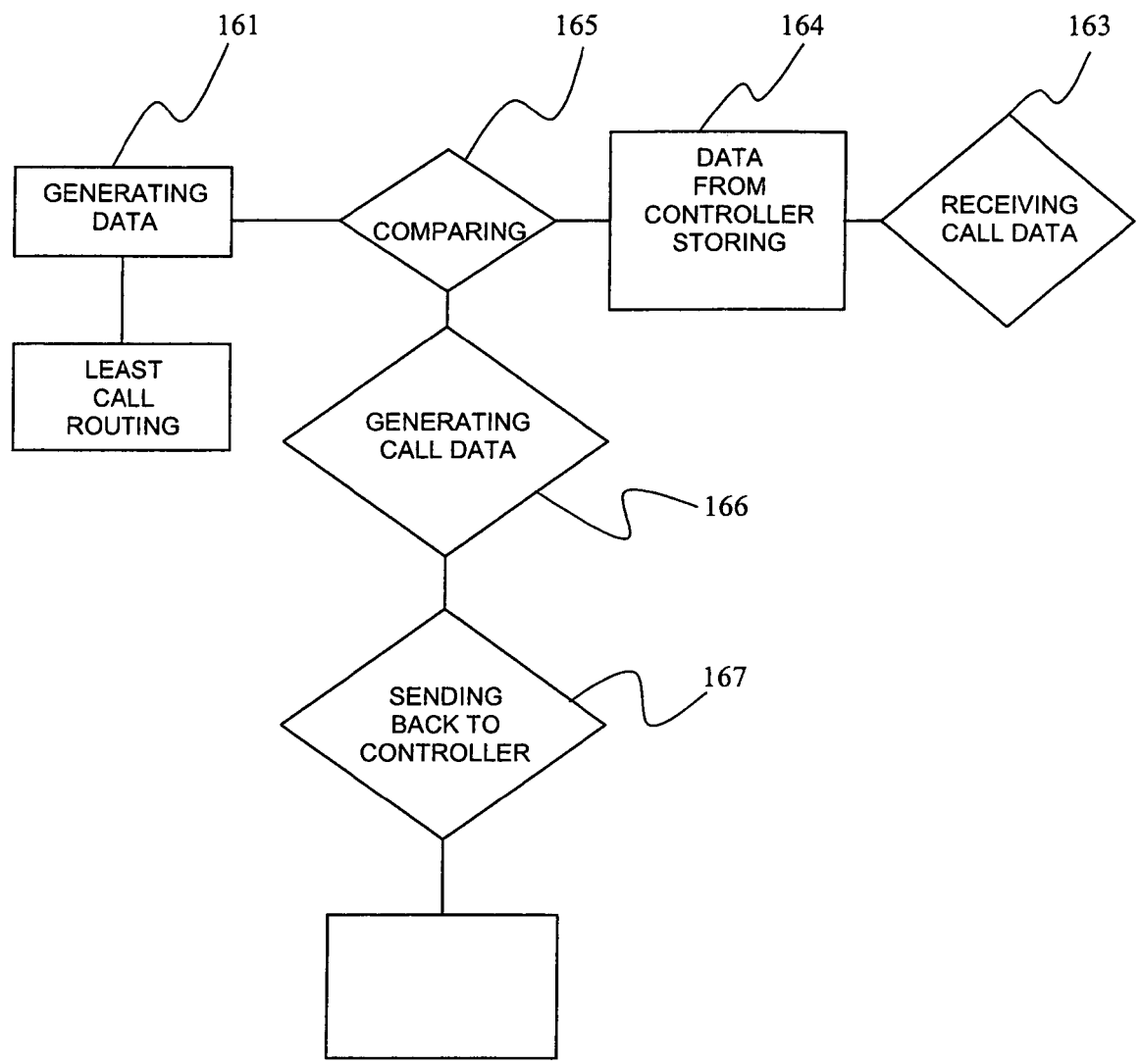
FIG. 14 is a flow chart for the central control function of the flow chart shown in FIG. 11.

The next step is that the central location takes steps which are shown in FIG. 14. There is generating data 161 which mainly consists of least call routing and call placing data. The computer at the central location takes the steps of receiving call data from the controller, storing the data from the controller, comparing the data to the call placing data and generating call data 166 which is then sent back to the controller by way of the step of sending call data back to the controller 167.

Referring back to FIG. 12, the next step at the controller is receiving information from the central computer 162. Based on the information received the next step is responding 168 by terminating the call 169 or by connecting the call to the telephone company. After the connection is made, the next step is soliciting a response from the second end user 171. This utilizes a database of solicitation options. A response is received from the user and the next step is comparing the response of the second user 173 to a database of second user rsponses 174 which results in terminating the call 175 or monitoring the call 176 according to the list of options for connecting and monitoring calls.

At any stage where the call is terminated, the termination step may include the step of informing the first end user of the system of the reason for the termination or such other message as is appropriate under the circumstances.

The monitoring options always include connecting the call 195 so that the two or more end users may engage in the conversation desired. The monitoring options database allows for a number of responses. Initially these include, in the preferred embodiment storing the data 178 which may include the step encoding the data 180 and may include mirroring the data within the controller 183 or storing the data in a mass storage unit 184. It may also include the subsequent steps of accessing or retrieving the data 185 or decoding the data 186 which may include the step of reconverting the data from digital to analog format or reducing the digital data to a typed format.

While the data is stored to the extent necessary, the purpose of comparing 181 the digital voice data of the phone call from the interface means 6 to the voice database 14 in ASR voice recognition and comparison means 16 shown in FIG. 9, located in close proximity to the controller 3 is in order to allow real time (or near real time) comparison.

If a comparison is made, the next step is marking 189 the data and combining 188 the new data with the old data stored in the interface means as data for storage shown as 179. Simultaneously, the call may be terminated as shown in terminating step 187 as a response. Other responses are notifying 190 a third party of the occurrence, and sending the information to the controller 3 which upon receiving 191 the data in step 188 compares the mark made in the marking 189 of the data to a database of options 11 and responding 193 accordingly by terminating the call 187 or by various forms of monitoring 194 as described above.

Because many varying and different embodiments may be made within the scope of the inventive concept herein taught and because many modifications may be made in the embodiment(s) herein detailed in accordance with the descriptive requirements of the law, it is to be understood that the details herein are to be interpreted as illustrative and not in a limiting sense.

We claim:

1. A method for use with a user interface controlling at least one database in communication with a telephone system for controlling a telephone call between at least two parties including a called party and a calling party said telephone call originating as voice signals, the voice signals having been converted to an electromagnetic signal in a digital format having at least one data pack of telephone call data, the telephone call data comprised of a plurality of digital datum, the digital datum including at least one digital word, the digital word comprised of at least one of the plurality of digital datum, comprising the steps of:

a) generating at least one preselected data from a telephone call specific group consisting of start date, start time, finish time, length of call, location numbers, pin numbers, name of user, usage of user, phone number called, length of the call, call origin, call destination and combinations thereof;

b) converting the at least one preselected data to a digital format;

c) creating a marker means for tracking on at least one database;

d) attaching the marker means to the at least one preselected data;

e) storing the at least one preselected data and marker means in the at least one database;

f) electronically attaching the marker means to the telephone call data;

g) storing the at least one preselected data and marker means in the at least one database;

h) storing in the at least one database a pre-selected option associated with the at least one preselected data, the preselected option selected from an options group consisting of connecting the telephone call, transmitting the electromagnetic signal, terminating the telephone call, stopping the electromagnetic signal, generating a second marker means for marking the location of the telephone call data and storing the at least one preselected data and the marker means in the at least one database, generating a second marking means and storing the at least one preselected data with the marker means in the at least one database, playing a recorded message in conjunction with the telephone call, forwarding the telephone call, sending the telephone call to the user and controlling the telephone call by the user, sending the telephone call to the user and monitoring the telephone call by the user, requesting information from the calling party, requesting information from the called party, responding to information from the calling party, responding to information from the called party, storing the at least one preselected data in the at least one database, storing the at least one electromagnetic signal in the at least one database, determining billing for the call and billing the call, generating a second marker means and storing the beginning time of the telephone call with the second marker marking means in the at least one database, generating a second marker means and storing the ending time of the telephone call with the second marker means, determining the length of the telephone call and storing the length of the telephone call in the at least one database, and combinations thereof;
   i) comparing the pre-selected option to the at least one preselected data and associated option from the database; and determining and storing in the at least one database potential data of interest possible in the at least one preselected data;
   j) comparing the at least one preselected data with the potential data; and
   k) effectuating the pre-selected option if the at least one preselected data matches the possible data in the database.

2. The method of claim 1, wherein the step of effectuating the pre-selected option further comprises the step of comparing in a central processing unit the potential data with at least one preselected data and controlling the telephone call with the central processing unit using at least one of the options from the options group.

3. The method of claim 1, wherein the method further comprises recording the telephone call data and the at least one telephone call specific preselected data as digital data in the at least one database for later retrieval.

4. The method of claim 3 further comprising the steps of
   a) inputting a plurality of code words;
   b) storing the plurality of code words in the at least one database;
   c) converting at least one of the code words into at least one phonic digital data corresponding to at least one pronunciation for the code word in the database;
   d) grouping in the at least one database a plurality of datum of the telephone call data into at least one data group comparable to the at least one phonic digital data;
   e) comparing the data groups to the at least one phonic digital data;
   f) effectuating the at least one associated option where the at least one phonetic digital data group matches the at least one phonetic digital data.

5. The method of claim 4 wherein the step of converting at least one of the code words further comprises converting the at least one phonetic digital data into at least one digital word and determining the range of timing and frequency for the at least one digital word, setting a preselected percentage of certainty, and determining similarity on the basis of the pre-selected percentage of certainty by comparing timing and frequency between the phonetic digital data and the at least one digital word.

6. The method of claim 1 wherein the steps of comparing and effectuating the pre-selected option is done at a remote location for at least one option from the group of options.

7. A method for use with a user interface (GUI) controlling at least one database in communication with a telephone system for controlling a telephone call between at least two parties including a called party and a calling party originating as voice signals, the voice signals having been converted to an electromagnetic signal in a digital format having at least one data pack of telephone call data, the telephone call data comprised of a plurality of digital datum, the digital datum including at least one digital word, the digital word comprised of a portion of the digital datum, comprising the steps of:
   a) selecting appropriate code words of interest to the user;
   b) converting at least one of the code words into phonic digital data corresponding to at least one pronunciation for the code word;
   c) grouping a plurality of datum of the telephone call data into at least one data group comparable to the phonic digital data;
   d) storing in the at least one database a pre-selected group of options consisting of connecting the telephone call, transmitting the electromagnetic signal, terminating the telephone call, terminating the electromagnetic signal, generating a marker means for marking the location of the telephone call data and storing at least one call preselected data with the marker means for later generating the marker means for later retrieval from the database, generating a marker means and storing at least one preselected data with the marker means, playing a recorded message in conjunction with the telephone call, forwarding the telephone call, sending the telephone call to the user and controlling the telephone call by the user, sending the telephone call to the user and monitoring the telephone call by the user, requesting information from the calling party, requesting information from the called party, storing at least one preselected data in the at least one data base, storing the electromagnetic signal in the at least one database, determining billing for the telephone call and billing the telephone call, generating a marker means and storing the beginning time of the telephone call with the marker means, generating a marker means and storing the ending time of the telephone call with the marker means, determining the length of the telephone call and storing the length of the telephone call in the at least one database, and combinations thereof;
   e) comparing the at least one data group to the phonic digital data; and
   f) effectuating an option from the pre-selected group of options if the at least one data group matches the phonetic digital data.

8. The method of claim 7, wherein the step of converting further comprises storing pre-selected voice digital data corresponding to specific code words that have been converted to digital data and determining the range of timing and frequency for the digital data.

9. The method of claim 8, wherein the step of comparing the at least one data group to the phonic digital data further comprises the steps of entering a plurality of code words; storing in the database at least one phonetic pronunciation associated with each of the plurality of code words; and comparing the at least one phonetic pronunciation to the phonetic digital data.

10. The method of claim 9, wherein the step of storing the at least one phonetic pronunciation further comprises the step of storing a plurality of pronunciations.

11. The method of claim 9, wherein the step of comparing comprises the steps of:
   (a) preselecting a percentage of certainty; and
   (b) comparing the timing and frequency for the digital data based on the percentage of certainty between the data groups and phonetic digital data.

12. The method of claim 7, further comprising the step of retrieving telephone call data from the at least one database by the user and reviewing telephone call data by the user.

13. The method of claim 12, wherein the step of reviewing telephone call data further comprises the step of converting the telephone call data to a printable format and displaying the phonetic digital data matching at least one code word in the printable format.

14. The method of claim 12, wherein the step of retrieving telephone call data further comprises the steps of recording telephone call data as a series of digital data in a string having at least one length, selecting at least one code word, marking electronically the location of at least one digital word corresponding to at least one code word within the series of digital data, selecting at least one second length of the string which is less than the at least one length including the at least one digital word, recovering the at least one second length and displaying the at least one second length.

15. The method of claim 14, wherein the step of selecting at least one second length further comprising the step of requesting a user defined length for the at least one second length from the user.

16. The method of claim 15, wherein the at least second length includes at least one word before the at least one digital word.

17. The method of claim 15, wherein the at least second length includes at least one word after the at least one digital word.

18. The method of claim 7, further comprising encoding the data so that it cannot be altered without modification of the data.

19. The method of claim 7, wherein the step of effectuating an option further comprises automatically effectuating an option.

20. The method of claim 7, wherein the step of effectuating an option further comprises notifying the user at the GUI and effectuating an option at the election of the user at the GUI.

21. The method of claim 7, wherein the steps of comparing an option and effectuating an option are done at a remote location for at least one option from the group of options.

22. The method of claim 21, wherein the steps of comparing an option and effectuating an option are done at the phone location for at least one option from the group of options.

23. The method of claim 1, wherein the telephone call specific data comprises a PIN number of the origin user.

24. The method of claim 23, comprising the step of obtaining the PIN number from a biological person specific marker for the calling party.

* * * * *